United States Patent
Kley et al.

(10) Patent No.: US 12,546,776 B2
(45) Date of Patent: Feb. 10, 2026

(54) MODULATION OF PROTEIN DEGRADATION

(71) Applicant: Orionis Biosciences, Inc., Waltham, MA (US)

(72) Inventors: Nikolai Kley, Waltham, MA (US); Samuel Lievens, Ghent (BE); Riccardo Sabatini, Waltham, MA (US)

(73) Assignee: Orionis Biosciences, Inc., Waltham, MA (US)

( * ) Notice: Subject to any disclaimer, the term of this patent is extended or adjusted under 35 U.S.C. 154(b) by 873 days.

(21) Appl. No.: 17/785,181

(22) PCT Filed: Dec. 15, 2020

(86) PCT No.: PCT/US2020/065022
§ 371 (c)(1),
(2) Date: Jun. 14, 2022

(87) PCT Pub. No.: WO2021/126805
PCT Pub. Date: Jun. 24, 2021

(65) Prior Publication Data
US 2023/0020607 A1   Jan. 19, 2023

Related U.S. Application Data

(60) Provisional application No. 62/949,021, filed on Dec. 17, 2019.

(51) Int. Cl.
| | | |
|---|---|---|
| G01N 33/566 | (2006.01) | |
| C07K 14/005 | (2006.01) | |
| C07K 14/47 | (2006.01) | |
| C12N 9/00 | (2006.01) | |
| C12N 9/10 | (2006.01) | |
| G01N 33/50 | (2006.01) | |

(52) U.S. Cl.
CPC ......... *G01N 33/566* (2013.01); *C07K 14/005* (2013.01); *C07K 14/47* (2013.01); *C12N 9/104* (2013.01); *C12N 9/93* (2013.01); *G01N 33/5008* (2013.01); *C12N 2740/16222* (2013.01); *C12Y 203/02* (2013.01); *C12Y 603/04005* (2013.01)

(58) Field of Classification Search
CPC ............. G01N 33/566; G01N 33/5008; C07K 14/005; C07K 14/47; C12N 9/104; C12N 9/93; C12N 2740/16222; C12Y 203/02; C12Y 603/04005
See application file for complete search history.

(56) References Cited

U.S. PATENT DOCUMENTS

| | | |
|---|---|---|
| 5,637,463 A | 6/1997 | Dalton et al. |
| 5,733,726 A | 3/1998 | Fu et al. |
| 5,885,779 A | 3/1999 | Sadowski et al. |
| 5,935,797 A | 8/1999 | Clayberger et al. |
| 6,479,280 B1 | 11/2002 | Muyldermans et al. |
| 7,855,270 B2 | 12/2010 | Eyckerman et al. |
| 8,003,757 B2 | 8/2011 | Eyckerman et al. |
| 8,048,986 B2 | 11/2011 | Eyckerman et al. |
| 10,092,555 B2 | 10/2018 | Chamberlain et al. |
| 10,830,762 B2 | 11/2020 | Cathers et al. |
| 11,311,608 B2 | 4/2022 | Ann et al. |
| 2017/0151339 A1 | 6/2017 | White et al. |
| 2017/0281738 A1 | 10/2017 | Svetlov et al. |
| 2018/0224435 A1 | 8/2018 | Chamberlain et al. |
| 2019/0017998 A1 | 1/2019 | Cathers et al. |

FOREIGN PATENT DOCUMENTS

| | | |
|---|---|---|
| EP | 1088892 A1 | 4/2001 |
| WO | 1990002809 A1 | 3/1990 |
| WO | 1992020791 A1 | 11/1992 |
| WO | 1995026400 A1 | 10/1995 |
| WO | 1997010330 A1 | 3/1997 |
| WO | 1997031113 A1 | 8/1997 |
| WO | 1997032017 A1 | 9/1997 |
| WO | 1998013502 A2 | 4/1998 |
| WO | 1999066324 A2 | 12/1999 |
| WO | 2000007014 A2 | 2/2000 |
| WO | 2000046406 A2 | 8/2000 |
| WO | 2001090188 A2 | 11/2001 |
| WO | 2003004643 A2 | 1/2003 |
| WO | WO 2012/141674 A2 | 10/2012 |
| WO | WO 2017/117118 A1 | 7/2018 |
| WO | WO 2018/144649 A1 | 8/2018 |
| WO | WO 2018/144832 A1 | 8/2018 |
| WO | 2019/060742 A1 | 3/2019 |
| WO | 2019/140380 A1 | 7/2019 |
| WO | WO 2019/140387 A1 | 7/2019 |

OTHER PUBLICATIONS

International Search Report & Written Opinion, PCT Application No. PCT/US22/65022, dated Mar. 16, 2021, 12 pages.
Methods Mol Biol 2015;1278:447-55 doi: 10.1007/978-1-4939-2425-7_29.
Nucleic Acids Research, vol. 38, Issue 6, Apr. 1, 2010, pp. 1902-1912.
J. Proteome Res., 2009, 8 (2), 877-886.
Nat. Methods 2(6) (Jun. 2005).
Molecular Endocrinology, vol. 21, Issue 11, Nov. 1, 2007, pp. 2821-2831.
Nucleic Acids Research, vol. 31, Issue 14, Jul. 15, 2003, p. e75.
Eyckerman, Design and use of a mammalian protein-protein interaction trap (MAPPIT). Science's STKE (2002).
FEBS Letters vol. 580, Issue 13, May 29, 2006, pp. 3301-3307.
Chem Biol. Jul. 2006; 13(7):711-22. doi: 10.1016/j.chembiol.2006.05.008.
J. Med. Chem. 2021, 64, 15, 10606-10620.
ChemMedChem. 16 (2): 316-318.

(Continued)

*Primary Examiner* — Shafiqul Haq
(74) *Attorney, Agent, or Firm* — Morgan, Lewis & Bockius LLP

(57) ABSTRACT

Methods of assessing the efficacy of an agent in treating a disease or disorder are provided that include determining whether the agent causes, or inhibits, direct or indirect recruitment and/or ubiquitination and/or degradation of argininosuccinate synthetase 1 (ASS1).

20 Claims, 16 Drawing Sheets

(56) References Cited

OTHER PUBLICATIONS

Nat Chem Biol. Nov. 1, 2020; 16(11): 1199-1207.
https://citeseerx.ist.psu.edu/viewdoc/download?doi=10.1.1.491.7020&rep=rep1&type=pdf.
Haines, et al., "Argininosuccinate synthase: at the center of arginine metabolism." International Journal of Biochemistry and Molecular Biology 2.1 (2011): 8-23.
Yu, et al., Preparation of recombinant argininosuccinate synthetase and argininosuccinate lyase: expression of the enzymes in rat tissues, J Biochem. May 1995; 117(5):952-7.
Tarasenko et al., Impaired T cell function in argininosuccinate synthetase deficiency. Journal of Leukocyte Biology. 2015;97(2):273-278.
Delage et al. (2010). Arginine deprivation and argininosuccinate synthetase expression in the treatment of cancer. Int. J. Cancer 126(12):2762-2772.
Bateman et al. (2017). Argininosuccinate Synthase 1 is a Metabolic Regulator of Colorectal Cancer Pathogenicity. ACS Chem Biol. 12(4):905-911.
Kreiniz et al. 2016. Acute Renal Failure Associated with Lenalidomide Treatment in Multiple Myeloma: A Rare Occurrence? Anticancer Res. 36(6):2889-2892.
Specter et al. (2011). Kidney dysfunction during lenalidomide treatment for AL amyloidosis. Nephrology Dialysis Transplantation, 26(3): 881-886.
Wanchoo et al. (2017). Renal Toxicities of Novel Agents Used for Treatment of Multiple Myeloma. Clinical Journal of the American Society of Nephrology: CJASN, 12(1): 176-189.

LEN

CC-220

"i"

"ii"

"iii"

LEN

CC-220

"i"

"iv"

MODULATION OF PROTEIN DEGRADATION

CROSS-REFERENCE TO RELATED APPLICATIONS

This application is a National Stage Entry of PCT/US20/65022, filed Dec. 15, 2020, which claims the benefit of U.S. Provisional Application No. 62/949,021, filed on Dec. 17, 2019, the entire contents of which are incorporated herein.

FIELD

Methods of screening compounds and/or assessing the efficacy of compounds in treating a disease or disorder are provided based on the presence, absence, or level of interaction of cereblon (CRBN) with argininosuccinate synthetase 1 (ASS1).

BACKGROUND

Targeted protein degradation, by way of eliminating a target protein in cells by routing it to the proteasome, or targeted protein inhibition, by way of trapping a target protein in higher order protein complexes, is a compelling new area in drug discovery. Molecular glues and bivalent inducers of protein degradation (also known as proteolysis-targeting chimeras (PROTACs)) represent compelling new modalities in therapeutics as they have the potential to inhibit and/or degrade targets previously thought to be undruggable, including at sub-stoichiometric concentrations, in ways not possible using conventional inhibitors. Molecular glues and PROTACs bind to certain proteins inside cells to induce the formation of molecular complexes that inhibit or degrade disease target proteins.

While the potential for these agents is large, it is hampered by certain liabilities, such as, the agents engaging targets that are not therapeutically relevant targets (off-targets), and whose engagement poses either risks for drug side effects and toxicities and/or reduces effective engagement of targets that are therapeutically relevant (e.g. due to competitive engagement of any off-targets). There remains a need for discovery of agents that are free from such liabilities.

SUMMARY

Accordingly, in various aspects, the present invention provides for discovery of therapeutic agents that promote, induce, enhance, and/or stabilize small molecule-protein (or small molecule-protein complex) interactions and/or lack or have substantially reduced target liabilities. The present invention provides, in various embodiments, methods for identifying compounds that are more efficacious and/or tolerated for disease treatment due to more selective modulation of disease-relevant targets, without cross-reactivity with and deviation to irrelevant or risk-posing or detrimental, e.g. off-target, interactions.

In aspects, the present invention relates to methods of identifying compounds that are not burdened by direct or indirect interactions and/or inducing direct or indirect interactions with argininosuccinate synthetase 1 (ASS1). For instance, the present invention provides, in embodiments, selection of compounds with reduced, low, or substantially no activity or ability to cause, induce, enhance or stabilize recruitment of ASS1 into a protein complex, and/or, as a consequence, inhibit ASS1 and/or promote ubiquitination and/or degradation of ASS1. In embodiments, the present invention provides selection of compounds with reduced, low, or substantially no activity or ability to cause, induce, enhance or stabilize direct binding of ASS1 with CRBN.

In various aspects, the present invention relates to a method for identifying a candidate compound by obtaining a test compound having the ability to bind to cereblon (CRBN), contacting the test compound with CRBN in the presence of ASS1, assaying for one or more of recruitment of ASS1 to CRBN, enhanced binding of ASS1 to the CRBN/test agent complex, ubiquitination of ASS1 and/or degradation of ASS1, and classifying the test compound as a candidate compound if reduced, low, or substantially no recruitment of ASS1 to CRBN, enhanced binding to CRBN/test agent complex, and/or ubiquitination of ASS1 and/or degradation of ASS1 is detected.

In various aspects, the present invention relates to a method for identifying a candidate compound by obtaining a test compound having the ability to bind to cereblon (CRBN), contacting the test compound with CRBN in the presence of ASS1, assaying for direct binding of ASS1 and CRBN, and classifying the test compound as a candidate compound if reduced, low, or substantially no direct binding of ASS1 to CRBN is detected.

In other aspects, the present invention relates to a method for making a candidate composition, by identifying a candidate compound and formulating the candidate composition for use in a therapy, where the identifying of a candidate compound is by obtaining a test compound having the ability to bind to CRBN; contacting the test compound with CRBN in the presence of ASS1; assaying for recruitment, enhanced binding of ASS1 to the CRBN/test agent complex, ubiquitination and/or degradation of ASS1; and classifying the test compound as a candidate compound if reduced, low, or substantially no recruitment, enhanced binding to CRBN/test agent complex, and/or ubiquitination and/or degradation of ASS1 is detected.

In other aspects, the present invention relates to a method for making a candidate composition, by identifying a candidate compound and formulating the candidate composition for use in a therapy, where the identifying of a candidate compound is by obtaining a test compound having the ability to bind to CRBN; contacting the test compound with CRBN in the presence of ASS1; assaying direct binding of ASS1 to the CRBN/test agent complex; and classifying the test compound as a candidate compound if reduced, low, or substantially no binding of ASS1 to CRBN/test agent complex is detected.

In embodiments, the method further includes the step of assaying for recruitment, ubiquitination, and/or degradation of a substrate or neosubstrate of CRBN that is not ASS1 (for example, without limitation, one that comprises a degron motif, for example, without limitation, Ikaros (IKZF1), Helios (IKZF2), Aiolos (IKZF3), Eos (IKZF4), Pegasus (IKZF5), SALL4, CSNK1A, CK1a, and/or ZFP91).

In embodiments, the classifying is based on the test compound's ability to shift a ratio of recruitment, binding to CRBN, ubiquitination, and/or degradation of ASS1 relative to recruitment, binding to CRBN, ubiquitination, and/or degradation of a substrate or neosubstrate of CRBN other than ASS1.

In embodiments, the candidate compound demonstrates reduced side effects in a subject receiving the candidate compound relative to one of thalidomide, lenalidomide, and pomalidomide.

In various embodiments, the test compound or candidate compound is a component of a proteolysis-targeting chimera (PROTAC). In various embodiments, the PROTAC comprises (i) a test compound or candidate compound as described herein, e.g. a CRBN binder, inclusive of the molecular glue compounds described above, and (ii) a compound which is capable of binding to a target protein that is different to the protein bound by the test compound (e.g., a CRBN substrate or a protein that will become a neosubstrate by virtue of recruitment to the test compound/CRBN complex), where (i) and (ii) are covalently attached via a linker.

In various embodiments, the test compound or candidate compound is a therapeutic compound.

BRIEF DESCRIPTION OF THE DRAWINGS

FIG. 3A shows results obtained from co-immunoprecipitations with an anti-Flag antibody, with subsequent Western blot analysis of the immunoprecipitated samples, and eluted from beads using Flag peptide. Western analysis was performed with an anti-HA antibody to determine extent of immunoprecipitated CRBN in each sample (expected to vary in dependence of CC220 exposure) and an anti-Flag antibody to determine extent of immunoprecipitated Flag-ASS1, Flag-gp130-ASS1 or Flag-IKZF3 in each sample (which would be expected to be the same). As shown in FIG. 3A (top panel), HA-CRBN is found in the ASS1-immunoprecipitates only in the presence of CC220, consistent with findings outlined in FIG. 1 and FIG. 2 that ASS1 is a ligand-induced neosubstrate of CRBN—i.e., a target that is recruited to CRBN in response to CC220 binding to CRBN. FIG. 3A (bottom panel) shows that same amount of Flag-tagged ASS1 or Flag-tagged IKZF3 was in the anti-Flag co-immunoprecipitates across relevant samples. FIG. 3B shows that in all samples subjected to immunoprecipitation analysis, shown in FIG. 3A, the relative expression of each of the proteins across the various sample obtained from cells transfected with the various constructs, was similar—as shown for HA-CRBN in top panel and Flag-ASS1, Flag-gp130-ASS1 or Flag-IKZF3 in lower panel. The results are consistent with results shown in FIG. 3A (lower panel).

In FIGS. 5A-5C, that signal is set to 100% luciferase activity. In a separate sample set up, cells were prepared in the same manner but, in addition, co-incubated with a test compound whose interaction with CRBN is investigated. Binding to the CRBN fusion protein would compete with binding of the hybrid ligand to the same CRBN protein, hence inhibiting the assay signal due to prevention of ternary complex formation, which is required to generate an assay signal. Increasing concentrations of test compound were assessed to determine CRBN binding efficiency as determined in this type of ligand competition experiment in living cells. As shown, the known IMiD compounds (lenalidomide/LEN, CC220) competed efficiently with the lenalidomide hybrid ligand for binding to CRBN (dose-response curves for CRBN-associated assay signal inhibition). Similarly, a set of other compounds compete efficiently. Specificity of signal inhibition is assessed by a parallel experimental set up in which test compound effect is assessed for inhibition of signal generated by a control gp130 fusion protein (CTRL) that directly binds to the DHFR-fusion protein in the absence of hybrid ligand (i.e. a direct interaction of the proteins). In summary, the results shown in FIGS. 5A-5C qualify the various compounds as potent CRBN binders.

In FIGS. 5D-5G and FIGS. 5H-5L we determined which of these CRBN-binding compounds would be efficient IKZF1 and/or ASS1 neosubstrate recruiters (respectively). In this experimental set-up cells were transfected with a construct encoding a CRBN-fusion protein and IKZF1 or ASS1 fusion protein. Test compound activity was assessed with increasing concentrations of test compounds (dose-response studies) to monitor ability to promote CRBN-ligand-induced protein interaction—i.e., recruitment of IKZF1 or ASS1 neosubstrates. As shown, known IMiD compounds (LEN, CC220) promote recruitment of both IKZF1 (FIGS. 5D-5G) and ASS1 (FIGS. 5H-5L), as do some other compounds. In contrast, two compounds (v, vi) shown here, which are as effective in CRBN binding as other compounds (FIGS. 5A-5C, competition curves), do not recruit IKZF1 (FIGS. 5D-5G) and ASS1 (FIGS. 5H-5L). This demonstrates that CRBN-ligands that are devoid of ASS1 neosubstrate recruitment activity can be identified and characterized for their differential protein recruitment activities. Compounds with reduced ability to recruit ASS1 versus other substrates (e.g., IKZF1), in comparison to LEN and CC220, have also been observed.

DETAILED DESCRIPTION

Figure 1:
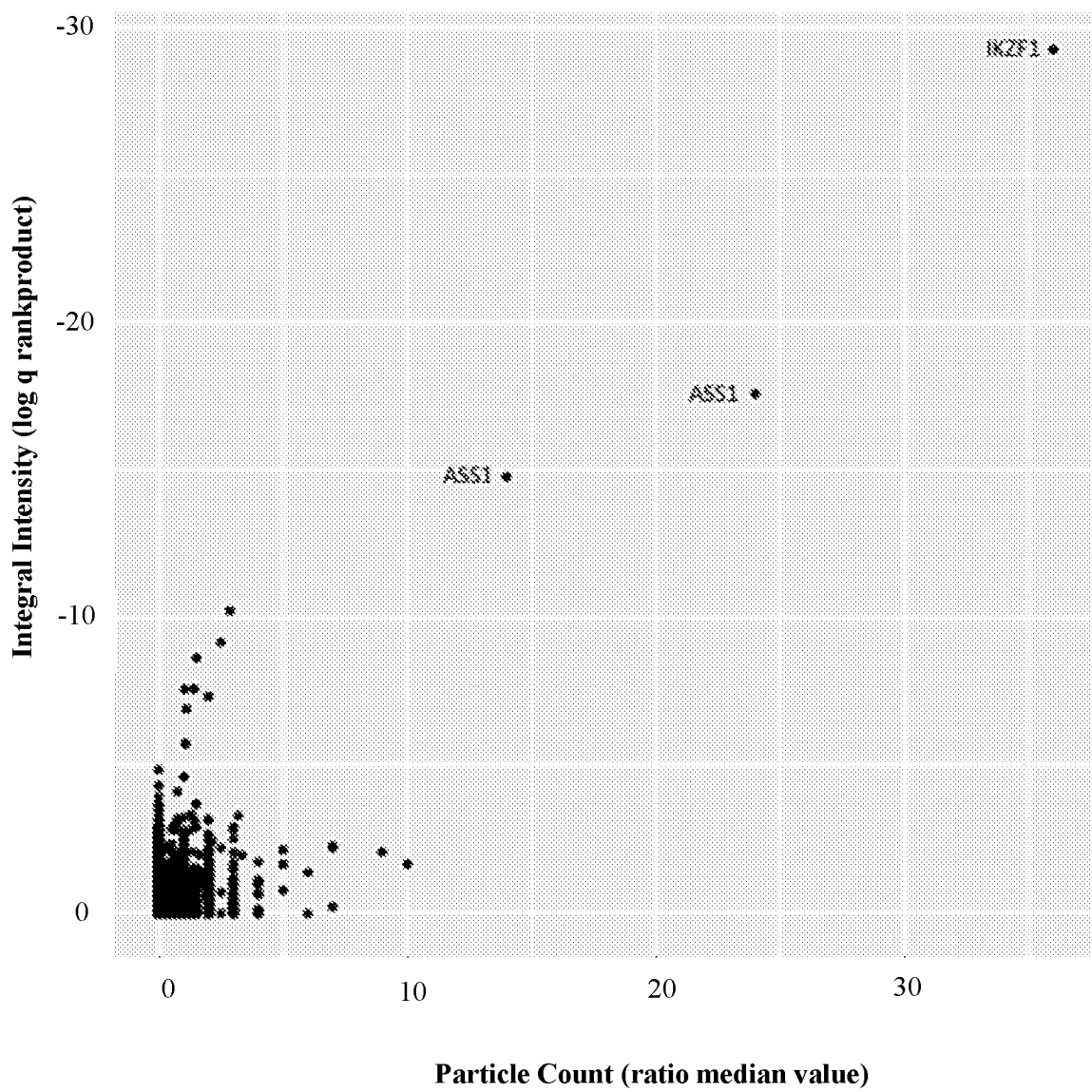
FIG. 1 Identification of recombinant ASS1 as a molecular glue-induced CRBN neosubstrate. ASS1 was identified by screening a human ORF(eome) cDNA library for targets recruited to CRBN in response to CC220, a known IMiD drug and CRBN ligand, using a variation of a two-hybrid technology system, MAPPIT, described previously (Lemmens, et al. "MAPPIT, a mammalian two-hybrid method for in-cell detection of protein-protein interactions," *Methods Mol Biol.* 2015; 1278:447-55 and Lievens, et al. "Array MAPPIT: high-throughput interactome analysis in mammalian cells," *J Proteome Res.* 2009 February; 8(2):877-86, the entire contents of which are herein incorporated by reference) and outlined in more detail in Example 1. Protein interactions in cells were assayed within cell clusters displayed in an array format. Each spot in a cell microarray corresponded to such a cell cluster expressing a single ORF/protein candidate that is being tested for ligand-induced (in this case CC220-induced) interaction with CRBN. A positive interaction was read out as an increase in cell fluorescence. Shown is a dot plot of the fluorescence intensity data from a cell microarray screen across/for a large number of individual ORFs/target protein candidates. The X-axis shows the Particle Count and the Y-Axis shows the integral intensity for each cell cluster in the microarray. As shown, and indicated, a significant induction of signal is observed for the cell array coordinate representing the ASS1 ORF. Induction of a signal for IKZF1, a known CC220-induced CRBN interactor, is also shown for reference.

The present invention is based, in part on the discovery that certain CRBN-binding compounds also recruit, promote, enhance, and/or stabilize the binding of CRBN and ASS1 and/or cause the recruitment of ASS1 to CRBN, ubiquitination of ASS1 and/or degradation of ASS1. Without wishing to be bound by theory, these interactions of CRBN-binding compounds with ASS1 may represent an off-target liability that reduces or depletes the capacity of CRBN-binding compounds to mediate CRBN-based interaction with more therapeutically-relevant substrates or neosubstrates of CRBN. Accordingly, in various aspects, the present invention provides for a method of identifying CRBN-binding compounds that are substantially devoid of ASS1-mediated effects.

In various embodiments, the present methods allow for insights in a CRBN-based network of interactions that underscore the potential for therapeutic efficacy and ASS1- or other target-associated liabilities of various compounds, and therefore allow for the discovery and construction of new or improved compounds that do not exhibit, or exhibits reduced, cross-reactivities and liabilities common to IMiDs, such as the currently marketed drugs thalidomide, lenalidomide and pomalidomide, for the treatment of diseases.

Methods of Identifying and/or Screening Compounds

In embodiments, methods of screening compounds and/or assessing the efficacy of CRBN-binding compounds in treating a disease or disorder are provided based on the presence, absence or level of direct or indirect interaction with ASS1. In embodiments, methods of screening compounds and/or assessing the efficacy of CRBN-binding compounds in treating a disease or disorder are provided based on the presence, absence or level of direct of direct interaction with ASS1. In various embodiments, there is provided a method of discovering agents that bind to or interact with CRBN but do not also cause, induce, enhance and/or stabilize direct or indirect recruitment of ASS1 to CRBN and/or cause the ubiquitination of ASS1 and/or degradation of ASS1.

In various aspects, the present invention relates to a method for identifying a candidate compound by obtaining a test compound having the ability to bind to CRBN, contacting the test compound with CRBN in the presence of ASS1, assaying for one or more of recruitment to CRBN, enhanced binding of ASS1 to the CRBN/test agent complex, ubiquitination of ASS1 and/or degradation of ASS1 and classifying the test compound as a candidate compound if reduced, low, or substantially no change in recruitment to CRBN, binding of ASS1 to the CRBN/test agent complex, ubiquitination of ASS1 and/or degradation of ASS1 is detected.

In various aspects, the present invention relates to a method for identifying a candidate compound by obtaining a test compound having the ability to bind to CRBN, contacting the test compound with CRBN in the presence of ASS1, assaying for direct binding of ASS1 to the CRBN/test agent complex, and classifying the test compound as a candidate compound if reduced, low, or substantially no change in direct binding of ASS1 to the CRBN/test agent complex is detected.

In other aspects, the present invention relates to a method for making a candidate composition, by identifying a candidate compound and formulating the candidate composition for use in a therapy, where the identifying of a candidate compound is by obtaining a test compound having the ability to bind to CRBN; contacting the test compound with CRBN in the presence of ASS1; assaying for one or more of recruitment of ASS1 to CRBN, enhanced binding of ASS1 to the CRBN/test agent complex, ubiquitination of ASS1 and/or degradation of ASS1; and classifying the test compound as a candidate compound if reduced, low, or substantially no recruitment to CRBN, enhanced binding of ASS1 to the CRBN/test agent complex, ubiquitination of ASS1 and/or degradation of ASS1 is detected.

In other aspects, the present invention relates to a method for making a candidate composition, by identifying a candidate compound and formulating the candidate composition for use in a therapy, where the identifying of a candidate compound is by obtaining a test compound having the ability to bind to CRBN; contacting the test compound with CRBN in the presence of ASS1; assaying for direct binding of ASS1 to the CRBN/test agent complex; and classifying the test compound as a candidate compound if reduced, low, or substantially no direct binding of ASS1 to the CRBN/test agent complex is detected.

In embodiments, the present invention relates to methods for developing agents that impact protein complex formation, ubiquitination and/or degradation. For instance, in various embodiments, the present invention relates to methods for developing agents that impact protein complex formation and/or degradation by shifting the activity and/or effects of CRBN towards a therapeutic pathway, e.g. favoring recruitment and/or degradation of a therapeutically relevant CRBN substrate or neosubstrate (for example, without limitation, one that comprises a degron motif, for example, without limitation, Ikaros (IKZF1), Helios (IKZF2), Aiolos (IKZF3), Eos (IKZF4), Pegasus (IKZF5), CSNK1A, CK1a, and/or ZFP91) and away from a non-therapeutic pathway (e.g. off target), e.g. disfavoring recruitment and/or degradation of ASS1 and/or other off target proteins, for example, without limitation, SALL4.

In some embodiments, the recruitment and/or ubiquitination, and/or degradation of ASS1 and/or a substrate or a neosubstrate of CRBN that is not ASS1 is assessed by measuring a level of protein or nucleic acid (e.g. RNA level) of the ASS1 and/or substrate or neosubstrate of CRBN that is not ASS1. In some embodiments, the recruitment and/or ubiquitination, and/or degradation of ASS1 and/or a substrate or a neosubstrate of CRBN that is not ASS1 is assessed relative to a reference (and/or each other). In embodiments, a decrease in relative recruitment, and/or ubiquitination, and/or degradation of ASS1 is, e.g. at least 10%, at least 15%, at least 20%, at least 25%, at least 30%, at least 35%, at least 40%, at least 45%, or at least 50%, or at least 60%, or at least 70%, or at least 80%, or at least 90%. In embodiments, the relative decrease in relative recruitment and/or ubiquitination, and/or degradation of ASS1 is least 2-, or 3-, or 4-, or 5-, or 7-, or 10-, or 15-, or 20-fold. In embodiments, a relative increase in recruitment, and/or ubiquitination, and/or degradation CRBN substrate or a neosubstrate that is not ASS1 is, e.g. at least 10%, at least 15%, at least 20%, at least 25%, at least 30%, at least 35%, at least 40%, at least 45%, or at least 50%, or at least 60%, or at least 70%, or at least 80%, or at least 90%. In embodiments, the relative increase in recruitment, and/or ubiquitination, and/or degradation CRBN substrate or a neosubstrate that is not ASS1 is least 2-, or 3-, or 4-, or 5-, or 7-, or 10-, or 15-, or 20-fold.

In some embodiments, the compound, test compound, candidate compound, or therapeutic compound binds to CRBN, permits binding or interaction between CRBN and a substrate or neosubstrate of CRBN other than ASS1, and does not permit substantial binding or interaction between CRBN and ASS1. In embodiments, the compound, test compound, candidate compound, or therapeutic compound mediates binding or interaction between CRBN and a substrate or neosubstrate of CRBN other than ASS1 and does not substantially mediate binding or interaction between CRBN and ASS1.

In various embodiments, the affinity (for CRBN) and/or recruitment (by CRBN) of and/or ubiquitination, and/or degradation of a substrate or neosubstrate of CRBN other than ASS1 is about 5-fold, 10-fold, or about 100-fold, or about 1,000-fold, or about 10,000-fold, or about 100,000-fold higher than that for ASS1. In various embodiments, the affinity (for CRBN) and/or recruitment (by CRBN) and/or ubiquitination, and/or recruitment and/or degradation of a substrate or neosubstrate of CRBN other than ASS1 is about 5-fold, 10-fold, or about 100-fold, or about 1,000-fold, or about 10,000-fold, or about 100,000-fold higher than that for ASS1, as mediated by the compound, test compound, candidate compound, or therapeutic compound.

In various embodiments, the affinity (for CRBN) and/or recruitment (by CRBN) of and/or ubiquitination, and/or degradation of a substrate or neosubstrate of CRBN other than ASS1 is about 5-fold to 10-fold, or about 5-fold to about 25-fold, or about 5-fold to about 50-fold, or about 5-fold to about 100-fold, or about 5-fold to about 250-fold, or about 5-fold to about 500-fold, or about 5-fold to about 1,000-fold, or about 5-fold to about 3,000-fold, or about 5-fold to about 5,000-fold, or about 5-fold to about 10,000-fold, or about 5-fold to about 30,000-fold, or about 5-fold to about 50,000-fold, or about 5-fold to about 100,000-fold, or 10-fold to about 50-fold, or about 10-fold to about 100-fold, or about 10-fold to about 250-fold, or about 10-fold to about 500-fold, or about 10-fold to about 1,000-fold, or about 10-fold to about 3,000-fold, or about 10-fold to about 5,000-fold, or about 10-fold to about 10,000-fold, or about 10-fold to about 30,000-fold, or about 10-fold to about 50,000-fold, or about 10-fold to about 100,000-fold, or about 100-fold to about 1,000-fold, or about 100-fold to about 3,000-fold, or about 100-fold to about 5,000-fold, or about 100-fold to about 10,000-fold, or about 100-fold to about 30,000-fold, or about 100-fold to about 50,000-fold, or about 100-fold to about 100,000-fold, or about 1,000-fold to about 10,000-fold, or about 1,000-fold to about 30,000-fold, or about 1,000-fold to about 50,000-fold, or about 1,000-fold to about 100,000-fold higher than the affinity (for CRBN) and/or recruitment (by CRBN) and/or ubiquitination and/or degradation of ASS1.

In various embodiments, the affinity (for CRBN) and/or recruitment (by CRBN) and/or ubiquitination and/or degradation of a substrate or neosubstrate of CRBN other than ASS1, as mediated by the compound, test compound, candidate compound, or therapeutic compound, is about 10-fold to about 50-fold, or about 10-fold to about 100-fold, or about 10-fold to about 250-fold, or about 10-fold to about 500-fold, or about 10-fold to about 1,000-fold, or about 10-fold to about 3,000-fold, or about 10-fold to about 5,000-fold, or about 10-fold to about 10,000-fold, or about 10-fold to about 30,000-fold, or about 10-fold to about 50,000-fold, or about 10-fold to about 100,000-fold, or about 100-fold to about 1,000-fold, or about 100-fold to about 3,000-fold, or about 100-fold to about 5,000-fold, or about 100-fold to about 10,000-fold, or about 100-fold to about 30,000-fold, or about 100-fold to about 50,000-fold, or about 100-fold to about 100,000-fold, or about 1,000-fold to about 10,000-fold, or about 1,000-fold to about 30,000-fold, or about 1,000-fold to about 50,000-fold, or about 1,000-fold to about 100,000-fold higher than the affinity (for CRBN) and/or recruitment (by CRBN) and/or ubiquitination and/or degradation of ASS1, as mediated by the compound, test compound, candidate compound, or therapeutic compound.

In some embodiments, the affinity (for CRBN) and/or recruitment (by CRBN) and/or ubiquitination and/or degradation of ASS1, as mediated by the compound, test compound, candidate compound, or therapeutic compound is assayed relative to the affinity (for CRBN) and/or recruitment (by CRBN) and/or ubiquitination and/or degradation of ASS1 by a reference compound.

In various embodiments, the reference compound is thalidomide, lenalidomide, pomalidomide, CC-220, or CC-122.

In some embodiments, the affinity (for CRBN) and/or recruitment (by CRBN) and/or ubiquitination and/or degradation of ASS1, as mediated by the compound, test compound, candidate compound, or therapeutic compound is assayed relative to the affinity (for CRBN) and/or recruitment (by CRBN) and/or ubiquitination and/or degradation of ASS1 in a basal state.

In some embodiments, the affinity (for CRBN) and/or recruitment (by CRBN) and/or ubiquitination and/or degradation of ASS1, as mediated by the compound, test compound, candidate compound, or therapeutic compound is assayed relative to the affinity (for CRBN) and/or recruitment (by CRBN) and/or ubiquitination and/or degradation of a substrate or neosubstrate of CRBN other than ASS1, and as mediated by the compound, test compound, candidate compound, or therapeutic compound.

In some embodiments, the present methods provide for (a) assaying the affinity (for CRBN) and/or recruitment (by CRBN) and/or ubiquitination and/or degradation of ASS1, as mediated by the compound, test compound, candidate compound, or therapeutic compound relative to the affinity (for CRBN) and/or recruitment (by CRBN) and/or ubiquitination and/or degradation of a substrate or neosubstrate of CRBN other than ASS1, as mediated by the compound, test compound, candidate compound, or therapeutic compound and (b) comparing to the affinity (for CRBN) and/or recruitment (by CRBN) and/or ubiquitination and/or degradation of ASS1, as mediated by a reference compound, relative to the affinity (for CRBN) and/or recruitment (by CRBN) and/or ubiquitination and/or degradation of a substrate or neosubstrate of CRBN other than ASS1, as mediated by the reference compound.

In various embodiments, the reference compound is thalidomide, lenalidomide, pomalidomide, CC-220, or CC-122.

In some embodiments, the present methods provide for (a) assaying the affinity (for CRBN) and/or recruitment (by CRBN) and/or ubiquitination and/or degradation of ASS1, as mediated by the compound, test compound, candidate compound, or therapeutic compound relative to the affinity (for CRBN) and/or recruitment (by CRBN) and/or ubiquitination and/or degradation of a substrate or neosubstrate of CRBN other than ASS1, as mediated by the compound, test compound, candidate compound, or therapeutic compound, and (b) comparing to the affinity (for CRBN) and/or recruitment (by CRBN) and/or ubiquitination and/or degradation of ASS1, as mediated by lenalidomide relative to the affinity (for CRBN) and/or recruitment (by CRBN) and/or ubiquitination and/or degradation of a substrate or neosubstrate of CRBN other than ASS1, as mediated by lenalidomide.

In some embodiments, a method of identifying a candidate compound is provided, involving contacting a cell with a test compound having the ability to bind to CRBN with a cell expressing CRBN; assaying for recruitment and/or ubiquitination and/or degradation of ASS1; and classifying the test compound as a candidate compound if reduced, low, or substantially no recruitment and/or ubiquitination and/or degradation of ASS1 is detected. In embodiments, the cell is further assayed for recruitment and/or ubiquitination and/or degradation of a substrate or neosubstrate of CRBN other than ASS1.

In embodiments, the methods described herein further comprising assaying for recruitment and/or ubiquitination and/or degradation of ASS1 and/or a substrate or neosubstrate of CRBN other than ASS1.

In embodiments, a degradation assay, ubiquitination assay, or proteomics experiment is used to assay recruitment, ubiquitination, or degradation. See, e.g. Kim, Sung Ah, et al. "A novel cereblon modulator for targeted protein degradation." European Journal of Medicinal Chemistry 166 (2019): 65-74; United States Patent Publication No. 2019/0017998, which are incorporated by reference in their entireties.

Cereblon (CRBN)

In embodiments, CRBN refers to the polypeptides comprising the amino acid sequence of any CRBN, such as a human CRBN protein (e.g., human CRBN isoform 1 (GenBank Accession No. NP_057386); or human CRBN isoforms 2 (GenBank Accession No. NP_001166953), each of which is herein incorporated by reference in its entirety), and related polypeptides, including SNP variants thereof. Related CRBN polypeptides include allelic variants (e.g., SNP variants); splice variants; fragments; derivatives; substitution, deletion, and insertion variants; fusion polypeptides; and interspecies homologs, which, in certain embodiments, retain CRBN activity and/or are sufficient to generate an anti-CRBN immune response.

In embodiments, the present invention relates to a compound, test compound, candidate compound, or therapeutic compound that binds CRBN. In embodiments, the present invention relates to a compound, test compound, candidate compound, or therapeutic compound that induces a CRBN conformational change (e.g., within a binding pocket of the CRBN) or otherwise alters the properties of a CRBN surface (e.g., on an adjacent region of the protein), where said CRBN conformational change or alteration results in ubiquitination of a neosubstrate.

ASS1

In embodiments, ASS1 refers to the polypeptides comprising the amino acid sequence of any ASS1, such as a human ASS1 protein (e.g., GenBank Accession No. AAH21676.1, which is hereby incorporated by reference in its entirety), and related polypeptides, including SNP variants thereof. Related ASS1 polypeptides include allelic variants (e.g., SNP variants); splice variants; fragments; derivatives; substitution, deletion, and insertion variants; fusion polypeptides; and interspecies homologs, which, in certain embodiments, retain ASS1 activity.

ASS1 is a urea cycle enzyme that presents a rate-limiting step in the arginine biosynthesis pathway by converting citrulline to arginine with the help of argininosuccinate lyase (ASL). More specifically, ASS1 catalyzes the condensation of citrulline and aspartate to form argininosuccinate, the immediate precursor of arginine. ASS1 is prevalent in liver as part of the urea cycle, and it has also been recognized as a ubiquitous enzyme in other tissues. Haines, et al., "Argininosuccinate synthase: at the center of arginine metabolism." International Journal of Biochemistry and Molecular Biology 2.1 (2011): 8-23.

ASS1 is ubiquitously expressed in various tissues, with its most abundant expression in the liver and kidney. Yu, et al., Preparation of recombinant argininosuccinate synthetase and argininosuccinate lyase: expression of the enzymes in rat tissues, *J Biochem.* 1995 May; 117(5):952-7.

ASS1 deficiencies are related to abnormal T cell differentiation and function, resulting in primary immune dysfunction. ASS1 deficiencies are linked to abnormal T cell differentiation and function.

Compound and/or Therapeutic Compound and/or Candidate Compound and/or Test Compound In embodiments, the present invention relates to a compound, test compound, candidate compound, or therapeutic compound that binds CRBN. In embodiments, the present invention relates to a compound, test compound, candidate compound, or therapeutic compound that induces a CRBN conformational change (e.g., within a binding pocket of the CRBN) or otherwise alters the properties of a CRBN surface (e.g., on an adjacent region of the protein). In embodiments, the present invention relates to a compound, test compound, candidate compound, or therapeutic compound that induces a CRBN conformational change (e.g., within a binding pocket of the CRBN) or otherwise alters the properties of a CRBN surface (e.g., on an adjacent region of the protein) and where said CRBN conformational change or alteration results binding of CRBN and a substrate and/or neosubstrate of CRBN that is not ASS1 and/or causes the ubiquitination of the substrate and/or neosubstrate of CRBN that is not ASS1 and/or degradation of the substrate and/or neosubstrate of CRBN that is not ASS1.

In embodiments, the present invention relates to a compound, test compound, candidate compound, or therapeutic compound that binds CRBN but weakly binds to, or does not substantially bind, ASS1. In embodiments, the present invention relates to a compound, test compound, candidate compound, or therapeutic compound that induces a CRBN conformational change (e.g., within the CMA-binding pocket of the CRBN) or otherwise alters the properties of a CRBN surface (e.g., on an adjacent region of the protein), where said CRBN conformational change or alteration results in ubiquitination and/or degradation of a substrate and/or neosubstrate of CRBN that is not ASS1 but weakly binds to, or does not substantially bind, ASS1.

In embodiments, the compound, test compound, candidate compound, or therapeutic compound binds CRBN but weakly binds to, or does not substantially bind, a substrate and/or neosubstrate of CRBN that is not ASS1. In embodiments, the compound, test compound, candidate compound, or therapeutic compound binds CRBN with an affinity of about 1 µM, or a higher affinity. In embodiments, the compound, test compound, candidate compound, or therapeutic compound binds CRBN with an affinity of about 500 nM, or about 300 nM, about 100 nM, about 30 nM, about 10 nM, or about 1 nM. In embodiments, the compound, test compound, candidate compound, or therapeutic compound binds CRBN with an affinity of about 500 nM, or about 300 nM, about 100 nM, about 30 nM, about 10 nM, or about 1 nM, while binding a substrate and/or neosubstrate of CRBN that is not ASS1 with an affinity of at least 1 µM, or at least 3 µM, or at least 10 µM, or at least 30 µM, or at least 100 µM, or at least 300 µM, or at least 1000 µM. In embodiments, the compound, test compound, candidate compound, or therapeutic compound weakly binds to, or does not substantially bind to, ASS1. In embodiments, the compound, test compound, candidate compound, or therapeutic compound binds ASS1 with an affinity of at least 1 µM, or at least 3, or at least 10 µM, or at least 30 µM, or at least 100 µM, or at least 300 µM, or at least 1000 µM. In embodiments, the compound, test compound, candidate compound, or therapeutic compound binds ASS1 with an affinity of at least 1 µM, or at least 3 µM, or at least 10 µM, or at least 30 µM, or at least 100 µM, or at least 300 µM, or at least 1000 µM, while binding CRBN with an affinity of about 500 nM, or about 300 nM, about 100 nM, about 30 nM, about 10 nM, or about 1 nM.

In various embodiments, the binding $K_D$ or EC50 of the compound, test compound, candidate compound, or therapeutic compound for CRBN is substantially lower than the binding $K_D$ or EC50 of the compound, test compound, candidate compound, or therapeutic compound for ASS1 (i.e. the binding of CRBN is substantially tighter than the binding for ASS1).

In various embodiments, the affinity of the compound, test compound, candidate compound, or therapeutic compound for CRBN is about 10-fold, or about 100-fold, or about 1,000-fold, or about 10,000-fold, or about 100,000-fold higher than the affinity of the compound, test compound, candidate compound, or therapeutic compound for ASS1.

In various embodiments, the affinity of the compound, test compound, candidate compound, or therapeutic compound for CRBN is about 10-fold to about 50-fold, or about 10-fold to about 100-fold, or about 10-fold to about 250-fold, or about 10-fold to about 500-fold, or about 10-fold to about 1,000-fold, or about 10-fold to about 3,000-fold, or about 10-fold to about 5,000-fold, or about 10-fold to about 10,000-fold, or about 10-fold to about 30,000-fold, or about 10-fold to about 50,000-fold, or about 10-fold to about 100,000-fold, or about 100-fold to about 1,000-fold, or about 100-fold to about 3,000-fold, or about 100-fold to about 5,000-fold, or about 100-fold to about 10,000-fold, or about 100-fold to about 30,000-fold, or about 100-fold to about 50,000-fold, or about 100-fold to about 100,000-fold, or about 1,000-fold to about 10,000-fold, or about 1,000-fold to about 30,000-fold, or about 1,000-fold to about 50,000-fold, or about 1,000-fold to about 100,000-fold lower than the affinity of the compound, test compound, candidate compound, or therapeutic compound for ASS1.

In various embodiments, the compound, test compound, candidate compound, or therapeutic compound binds CRBN about 10-fold, or about 100-fold, or about 1,000-fold, or about 10,000-fold, or about 100,000-fold tighter than it binds ASS1.

In various embodiments, the compound, test compound, candidate compound, or therapeutic compound binds to CRBN about 10-fold to about 50-fold, or about 10-fold to about 100-fold, or about 10-fold to about 250-fold, or about 10-fold to about 500-fold, or about 10-fold to about 1,000-fold, or about 10-fold to about 3,000-fold, or about 10-fold to about 5,000-fold, or about 10-fold to about 10,000-fold, or about 10-fold to about 30,000-fold, or about 10-fold to about 50,000-fold, or about 10-fold to about 100,000-fold, or about 100-fold to about 1,000-fold, or about 100-fold to about 3,000-fold, or about 100-fold to about 5,000-fold, or about 100-fold to about 10,000-fold, or about 100-fold to about 30,000-fold, or about 100-fold to about 50,000-fold, or about 100-fold to about 100,000-fold, or about 1,000-fold to about 10,000-fold, or about 1,000-fold to about 30,000-fold, or about 1,000-fold to about 50,000-fold, or about 1,000-fold to about 100,000-fold tighter than the compound, test compound, candidate compound, or therapeutic compound binds ASS1.

In embodiments, the compound, test compound, candidate compound, or therapeutic compound is a molecular glue. In embodiments, the compound, test compound, candidate compound, or therapeutic compound comprises a glutarimide ring and a phthalimide ring, either or both of which is optionally chemically modified. In embodiments, the glutarimide ring of the compound, test compound, candidate compound, or therapeutic compound is capable of hydrogen binding with a cage of three tryptophan residues in CRBN. In embodiments, the compound, test compound, candidate compound, or therapeutic compound induces exposure of a hydrophobic surface of CRBN that allows for interaction with a neosubstrate.

In embodiments, the compound, test compound, candidate compound, or therapeutic compound is an immunomodulatory drug or an immunomodulatory imide drug (IMiD). In embodiments, the compound, test compound, candidate compound, or therapeutic compound is a compound that contains a IMiD-like glutarimide ring, but otherwise differs in chemical structure and binds to the same small molecule binding pocket as a glutarimide-IMiD in CRBN (the IMiD binding pocket in CRBN). In embodiments, the compound, test compound, candidate compound, or therapeutic compound is a compound that does not contain a glutarimide ring and can bind CRBN in the IMiD pocket. In embodiments, the compound, test compound, candidate compound, or therapeutic compound is a compound that binds CRBN, but not in the IMiD pocket.

Thalidomide, and its close derivatives, lenalidomide and pomalidomide, known as immunomodulatory drugs (IMiDs), are used to treat a variety of clinical conditions such as multiple myeloma, lymphoma and other hematological diseases. Without being limited by any particular theory, immunomodulatory drugs used in the invention may be potent co-stimulators of T cells and increase cell proliferation in a dose dependent manner. Immunomodulatory drugs of the invention may also have a greater co-stimulatory effect on the CD8+ T cell subset than on the CD4+ T cell subset. In addition, the immunomodulatory drugs have anti-inflammatory properties and co-stimulate T cells.

In embodiments, the compound, test compound, candidate compound, or therapeutic compound binds CRBN and not ASS1. In embodiments, the compound, test compound, candidate compound, or therapeutic compound binds CRBN and a substrate and/or neosubstrate of CRBN that is not ASS1. In embodiments, the compound, test compound, candidate compound, or therapeutic compound is capable of binding CRBN and one or more of ASS1 and substrate and/or neosubstrate of CRBN that is not ASS1 at the same time.

In embodiments, the compound, test compound, candidate compound, or therapeutic compound is heterobifunctional or a component of a heterobifunctional compound.

In embodiments, the compound, test compound, candidate compound, or therapeutic compound is a proteolysis-targeting chimera (PROTAC). In various embodiments, the test compound or candidate compound is a component of a proteolysis-targeting chimera (PROTAC).

In various embodiments, the present invention relates to the discovery or identification of a compound which is suitable for inclusion in a PROTAC (e.g. as a component of a PROTAC), e.g. by having the characteristic of being able to bind CRBN but weakly bind to, or not substantially bind, ASS1.

In various embodiments, the present invention relates to the discovery or identification of a compound which is suitable for inclusion in a PROTAC (e.g. as a component of a PROTAC), e.g. by having the characteristic of being able to bind CRBN but weakly bind to, or not substantially bind, ASS1 and/or a substrate and/or neosubstrate of CRBN that is not ASS1.

In embodiments, the PROTAC incorporates a ligand for the intracellular target protein and an E3 ubiquitin ligase recruiting group, joined by a linker of a length appropriate to bring together target protein and ubiquitinating machinery and thereby elicit the ubiquitination of the protein of interest and its subsequent degradation in the proteasome.

In various embodiments, the PROTAC comprises (i) a test compound or candidate compound as described herein, e.g. a CRBN binder, inclusive of the molecular glue compounds described above, and (ii) a compound which is capable of binding a target protein that is different to the protein bound by the test compound (e.g., a CRBN substrate or a protein that will become a neosubstrate by virtue of recruitment to the test compound/CRBN complex), where (i) and (ii) are covalently attached via a linker In embodiments, the PROTAC further comprises a moiety that is capable of binding a substrate and/or neosubstrate of CRBN that is not ASS1.

In embodiments, the PROTAC further comprises a linker. In embodiments, the linker is of a length appropriate to bring together a target protein (e.g. ASS1 and/or a substrate and/or neosubstrate of CRBN that is not ASS1) and ubiquitinating machinery and thereby elicit the ubiquitination of the protein of interest and its subsequent degradation in the proteasome.

In embodiments, the PROTAC comprises (i) a compound, test compound, candidate compound, or therapeutic compound and (ii) the moiety that is capable of binding a substrate and/or neosubstrate of CRBN that is not ASS1 covalently attached to the linker.

In various embodiments, the present invention relates to a PROTAC comprising (a) a compound, test compound, candidate compound, or therapeutic compound that binds CRBN but weakly binds to, or does not substantially bind, ASS1 and (b) a compound which binds a substrate and/or neosubstrate of CRBN that is not ASS1.

In embodiments, the compound, test compound, candidate compound, or therapeutic compound comprises (i) a compound, test compound, candidate compound, or therapeutic compound that binds CRBN and (ii) a moiety that is capable of binding ASS1 and/or a substrate and/or neosubstrate of CRBN that is not ASS1, covalently attached to the linker.

In embodiments, the compound, test compound, candidate compound, or therapeutic compound is heterobifunctional and capable of conjugation via click chemistry. Click chemistry describes reactions that are high yielding, wide in scope, create only by-products that can be removed without chromatography, are stereospecific, simple to perform and can be conducted in easily removable or benign solvents (Rostovtsev et al. (2002) A Stepwise Huisgen Cycloaddition Process: Copper(I)-Catalyzed Regioselective "Ligation" of Azides and Terminal Alkynes. *Angew. Chem. Int. Ed.* 41: 2596-2599). Click chemistry has been implemented in many different forms, with wide applications in both chemistry and biology. A subclass of click reactions involve reactants which are inert to the surrounding biological milieu. Such click reactions are termed bioorthogonal (Sletten et al. (2009) Bioorthogonal Chemistry: Fishing for Selectivity in a Sea of Functionality. *Angew. Chem. Int. Ed.* 48: 6974-6998). Bioorthogonal reactant pairs suitable for bioorthogonal click chemistry are molecular groups with the following properties: (1) they are mutually reactive but do not significantly cross-react or interact with cellular biochemical systems in the intracellular milieu; (2) they and their products and byproducts are stable and nontoxic in physiological settings; and (3) their reaction is highly specific and fast. In embodiments, the compound, test compound, candidate compound, or therapeutic compound is heterobifunctional and capable of conjugation via bioorthogonal click chemistry.

In embodiments, the compound, test compound, candidate compound, or therapeutic compound is CLIckable Proteolysis TArgeting Chimeras (CLIPTACs). Such CLIPTAC, in embodiments, includes (a) a first portion comprising a ligand for an intracellular target protein (e.g. ASS1 and/or a substrate and/or neosubstrate of CRBN that is not ASS1); (b) a second portion comprising a ligand for an E3 ubiquitin ligase; and (c) a linker portion covalently coupling the first and second portions; wherein the linker comprises a covalent bond produced by a bioorthogonal click reaction between a compatible pair of reactive moieties.

In embodiments, the compound, test compound, candidate compound, or therapeutic compound is an in-cell click-formed proteolysis targeting chimera (CLIPTAC).

Other Substrates/Ratio Determination

In embodiments, a substrate and/or neosubstrate of CRBN that is not ASS1 is, for example, a protein substrate of the E3 ubiquitin ligase complex involving CRBN, or the downstream substrates thereof.

In embodiments, the methods described herein further comprise assaying for recruitment and/or ubiquitination and/or degradation of a substrate and/or neosubstrate of CRBN that is not ASS1. In embodiments, the substrate and/or neosubstrate of CRBN that is not ASS1 comprises a degron motif.

In embodiments, the substrate and/or neosubstrate of CRBN that is not ASS1 comprises b-hairpin a-turn with an i-residue bearing a side chain with a hydrogen bond acceptor, such as Asx or ST motifs, with a hydrogen bond between the sidechain of i and the backbone NH of i+3 and between the backbone carbonyl oxygen of i and the backbone NH of i+4. In embodiments, the i+4 residue is glycine (non-limiting examples include GSPT1, CK1a).

In embodiments, the substrate and/or neosubstrate of CRBN that is not ASS1 has a b-hairpin a-turn with residues i and i+3 being cysteine and the i+4 residue being glycine. The two Cys residues bind to a zinc ion to enforce the shape of the turn (non-limiting examples include IKZF1, ZnF692 and all the substrate reported in "Defining the human C2H2 zinc finger degrome targeted by thalidomide analogs through CRBN", Sievers t al, *Science* Vol. 362, Issue 6414, DOI: 10.1126/science.aat0572 (2018), incorporated by reference in its entirety).

In embodiments, the substrate and/or neosubstrate of CRBN that is not ASS1 has a "pseudo-loop", a b-hairpin b-turn bearing a glycine in the i+3 position. Turn structure can be enforced by a hydrogen bond between a hydrogen bond acceptor of the i−1 side chain and the carbonyl of the i+3 glycine (a non-limiting example includes CDC7).

In embodiments, the substrate and/or neosubstrate of CRBN that is not ASS1 is selected from Ikaros (IKZF1), Helios (IKZF2), Aiolos (IKZF3), Eos (IKZF4), Pegasus (IKZF5), CSNK1A, CK1a, and ZFP91.

In embodiments, the methods described herein further comprise assaying for recruitment and/or degradation of ASS1.

In various embodiments, the present methods permit determination of levels of ASS1 as compared to substrate and/or neosubstrate of CRBN that is not ASS1. In various embodiments, the present methods permit determination of levels of substrate and/or neosubstrate of CRBN that is not ASS1 as compared to ASS1.

In various embodiments, the reduced, low or substantially no recruitment and/or degradation of ASS1 is relative to the amount of recruitment and/or degradation of the substrate and/or neosubstrate of CRBN that is not ASS1.

In embodiments, the classifying described herein is based on the test compound's ability to shift a ratio of recruitment, binding to CRBN, ubiquitination of ASS1, and/or degradation of ASS1 relative to recruitment by CRBN, binding to CRBN, ubiquitination, and/or degradation of a different substrate and/or neosubstrate of CRBN that is not ASS1.

For example, in an embodiment, the shift is in the ratio of recruitment of ASS1 to recruitment of a CRBN substrate and/or neosubstrate of CRBN that is not ASS1, or the shift is in the ratio of recruitment of ASS1 to binding to CRBN of a substrate and/or neosubstrate of CRBN that is not ASS1, or the shift is in the ratio of recruitment of ASS1 to ubiquitination of a substrate and/or neosubstrate of CRBN that is not ASS1, or the shift is in the ratio of recruitment of ASS1 to degradation of a substrate and/or neosubstrate of CRBN that is not ASS1.

For example, in an embodiment, the shift is in the ratio of binding to CRBN of ASS1 to recruitment of a substrate and/or neosubstrate of CRBN that is not ASS1, or the shift is in the ratio of binding to CRBN of ASS1 to binding to CRBN of a substrate and/or neosubstrate of CRBN that is not ASS1, or the shift is in the ratio of binding to CRBN of ASS1 to ubiquitination of a substrate and/or neosubstrate of CRBN that is not ASS1, or the shift is in the ratio of binding to CRBN of ASS1 to degradation of a substrate and/or neosubstrate of CRBN that is not ASS1.

By way of another example, in an embodiment, the shift is in the ratio of ubiquitination of ASS1 to recruitment of a substrate and/or neosubstrate of CRBN that is not ASS1, or the shift is in the ratio of ubiquitination of ASS1 to binding to CRBN of a substrate and/or neosubstrate of CRBN that is not ASS1, or the shift is in the ratio of ubiquitination of ASS1 to ubiquitination of a substrate and/or neosubstrate of CRBN that is not ASS1, or the shift is in the ratio of ubiquitination of ASS1 to degradation of a substrate and/or neosubstrate of CRBN that is not ASS1.

By way of a further example, in an embodiment, the shift is in the ratio of degradation of ASS1 to recruitment of a substrate and/or neosubstrate of CRBN that is not ASS1, or the shift is in the ratio of degradation of ASS1 to binding to CRBN of a substrate and/or neosubstrate of CRBN that is not ASS1, or the shift is in the ratio degradation of ASS1 to ubiquitination of a substrate and/or neosubstrate of CRBN that is not ASS1, or the shift is in the ratio of degradation of ASS1 to degradation of a substrate and/or neosubstrate of CRBN that is not ASS1.

In various embodiments, the compound or test compound is classified as a candidate compound or a therapeutic compound based on an ability to favor recruitment, ubiquitination, and/or degradation of substrate and/or neosubstrate of CRBN that is not ASS1 as compared to recruitment, ubiquitination, and/or degradation of ASS1.

In various embodiments, the reduced, low or substantially no recruitment and/or degradation of ASS1 is relative to an amount of recruitment, ubiquitination and/or degradation of ASS1 in a reference sample lacking the compound or test compound.

In various embodiments, the reduced, low or substantially no recruitment and/or degradation of ASS1 is relative to an amount of recruitment, ubiquitination and/or degradation of ASS1 at a basal state.

In embodiments, the degradation is ubiquitin-dependent.

Illustrative Diseases

The compound, test compound, candidate compound, or therapeutic compound in accordance with the present disclosure can be formulated for treatment of various types of cancer.

In embodiments, there is provided a method for making a candidate compound for cancer therapy by identifying a candidate compound by obtaining a test compound having the ability to bind to CRBN, contacting the test compound with CRBN in the presence of ASS1, assaying for recruitment and/or degradation of ASS1, and classifying the test compound as a candidate compound if reduced, low or substantially no recruitment and/or degradation of ASS1 is detected and formulating the candidate compound for use in cancer.

In embodiments, there is provided a method for making a therapeutic compound for cancer therapy by identifying a therapeutic compound and formulating the therapeutic composition for use in a therapy, where the identifying of a therapeutic compound is by obtaining a test compound having the ability to bind to CRBN; contacting the test compound with CRBN in the presence of ASS1; assaying for recruitment and/or degradation of ASS1; and classifying the test compound as a therapeutic compound if reduced, low or substantially no recruitment and/or degradation of ASS1 is detected and formulating the therapeutic compound for use in cancer.

In embodiments, the cancer is selected from basal cell carcinoma, biliary tract cancer; bladder cancer; bone cancer; brain and central nervous system cancer; breast cancer; cancer of the peritoneum; cervical cancer; choriocarcinoma; colon and rectum cancer; connective tissue cancer; cancer of the digestive system; endometrial cancer; esophageal cancer; eye cancer; cancer of the head and neck; gastric cancer (including gastrointestinal cancer); glioblastoma; hepatic carcinoma; hepatoma; intra-epithelial neoplasm; kidney or renal cancer; larynx cancer; leukemia; liver cancer; lung cancer (e.g., small-cell lung cancer, non-small cell lung cancer, adenocarcinoma of the lung, and squamous carcinoma of the lung); melanoma; myeloma; neuroblastoma; oral cavity cancer (lip, tongue, mouth, and pharynx); ovarian cancer; pancreatic cancer; prostate cancer; retinoblastoma; rhabdomyosarcoma; rectal cancer; cancer of the respiratory system; salivary gland carcinoma; sarcoma; skin cancer; squamous cell cancer; stomach cancer; testicular cancer; thyroid cancer; uterine or endometrial cancer; cancer of the urinary system; vulval cancer; lymphoma including Hodgkin's and non-Hodgkin's lymphoma, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia; chronic lymphocytic leukemia (CLL); acute lymphoblastic leukemia (ALL); Hairy cell leukemia; chronic myeloblastic leukemia; as well as other carcinomas and sarcomas; and post-transplant lymphoproliferative disorder (PTLD), as well as abnormal vascular proliferation associated with phakomatoses, edema (such as that associated with brain tumors), and Meigs' syndrome.

In some embodiments, the cancer is leukemia or lymphoma. Illustrative leukemias or lymphomas include, but are not limited to, a leukemia or lymphoma selected from B cell lymphoma, non-Hodgkin's lymphoma (NHL) including low grade and intermediate grade non-Hodgkin's lymphomas (NHLs), relapsed Hodgkin's disease, resistant Hodgkin's disease high grade, lymphocyte predominant subtype of Hodgkin's lymphoma, precursor B cell lymphoblastic leukemia/lymphoma, mature B cell neoplasm, B cell chronic lymphocytic leukemia (CLL), small lymphocytic lymphoma (SLL), B cell prolymphocytic leukemia, lymphoplasmacytic lymphoma, mantle cell lymphoma (MCL), follicular lymphoma (FL) including low-grade, intermediate-grade and high-grade FL, cutaneous follicle center lymphoma, marginal zone B cell lymphoma, MALT type marginal zone B cell lymphoma, nodal marginal zone B cell lymphoma, splenic type marginal zone B cell lymphoma, hairy cell leukemia, diffuse large B cell lymphoma, Burkitt's lymphoma, plasmacytoma, plasma cell myeloma, post-transplant lymphoproliferative disorder, Waldenstrom's macroglobulinemia, multiple myeloma, and anaplastic large-cell lymphoma (ALCL).

In embodiments, the cancer is a hematologic malignancy, optionally selected from multiple myeloma and 5q-deletion-associated myelodysplastic syndrome (del(5q) MDS).

In some embodiments, the cancer is multiple myeloma.

Side Effect Profiling and/or Reduction

In various embodiments, the present methods allow for identification of improved compounds that can help reduce or prevent various side effects, e.g., those associated with IMiDs, e.g., lenalidomide. Drug-induced liver injury is a known serious problem that can develop following the use of many drugs. Drug-induced liver injury was estimated to occur annually between 10 and 15 per 10,000 to 100,000 persons exposed to prescription medications. See Sgro et al., *Hepatology* 2002; 36(2):451. It has been suggested that ASS1 is present in immune organs and T cells and plays a role in T cell function. See Tarasenko et al., Impaired T cell function in argininosuccinate synthetase deficiency. *Journal of Leukocyte Biology.* 2015; 97(2):273-278. The studies demonstrated that the defect in the ASS1 enzyme in T cells is related to abnormal T cell differentiation and function, resulting in primary immune dysfunction.

Despite their therapeutic benefits, thalidomide, lenalidomide, and pomalidomide are known to be associated with complications such as, for example, kidney and liver toxicity. Both thalidomide and lenalidomide have been implicated in instances of acute liver injury which can be severe and have led to deaths from acute liver failure. For example, renal failure is a serious potential complication of lenalidomide therapy in multiple myeloma. See Kreiniz et al. 2016. Acute Renal Failure Associated with Lenalidomide Treatment in Multiple Myeloma: A Rare Occurrence? *Anticancer Res.* 36(6):2889-2892. In one study, 66% of patients with AL amyloidosis showed worsening of kidney function during lenalidomide treatment, and the kidney dysfunction was severe in 32% of the patients. Specter et al. (2011). Kidney dysfunction during lenalidomide treatment for AL amyloidosis. *Nephrology Dialysis Transplantation,* 26(3): 881-886. Kidney toxicity, which has been reported for multiple myeloma patients and for other cancer patients, is now a recognized potential complication of lenalidomide and pomalidomide treatments. Wanchoo et al. (2017). Renal Toxicities of Novel Agents Used for Treatment of Multiple Myeloma. *Clinical Journal of the American Society of Nephrology: CJASN,* 12(1): 176-189.

In embodiments, the present invention relates to a method of making a candidate and/or therapeutic compound in the manner that reduces or eliminates potential side effects of the agent. In embodiments, the candidate and/or therapeutic compound is identified by determining whether the compound binds to or interacts with CRBN so as to change a ratio of therapeutically relevant downstream activity of CRBN to a side effect-inducing downstream activity of CRBN, where the therapeutically relevant downstream activity of CRBN includes recruitment and/or degradation of a substrate and/or neosubstrate of CRBN that is not ASS1 (e.g. one that comprises a degron motif, e.g. Ikaros (IKZF1), Helios (IKZF2), Aiolos (IKZF3), Eos (IKZF4), Pegasus (IKZF5), CSNK1A, CK1a, and/or ZFP91) and the side effect-inducing downstream activity of CRBN includes reduced of ablated recruitment and/or degradation of ASS1. Stated another way, the agent favors CRBN's therapeutic downstream effects and disfavors CRBN's non-therapeutic downstream effects.

In some embodiments, the present methods involve the interrogation of ASS1 as an indicator of whether a compound will have safety concerns, e.g., kidney or hepatic safety concerns, or effect on T cells (e.g., without limitation, impaired T cell functions). For instance, the detection of degradation of ASS1 may indicate that a compound will be plagued by safety concerns.

In some embodiments, the present methods relate to treatment of a disease in a manner that has less or no side effects. For instance, the treatment method involves, in embodiments, selecting a CRBN-binding compound for therapy based on an ASS1 profile (e.g. reduced of ablated recruitment and/or degradation of ASS1) that favors less side effects.

In embodiments, the compound, test compound, candidate compound, and/or therapeutic compound demonstrates reduced side effects in a subject receiving the compound, test compound, candidate compound, and/or therapeutic compound relative to another CRBN-binding compound. In embodiments, the compound, test compound, candidate compound, and/or therapeutic compound demonstrates reduced side effects in a subject receiving the compound, test compound, candidate compound, and/or therapeutic compound relative to one of thalidomide, lenalidomide, and pomalidomide.

In embodiments, the side effects include reduced or impaired liver function and/or include reduced or impaired kidney function. In embodiments, the side effects include T cell effects (e.g., without limitation impaired T cell functions).

Promoting Degradation of ASS1/ASS1-Dependent Cancers

ASS1 is overexpressed in various human cancers, including in lung, colon, gastric and ovarian cancer. Delage et al. (2010). Arginine deprivation and argininosuccinate synthetase expression in the treatment of cancer. Int. J. Cancer 126(12):2762-2772. For example, it has been recently shown that ASS1 is an upregulated target in primary human colorectal tumors and that pharmacological inhibition or genetic ablation of ASS1 impairs colorectal cancer pathogenicity. Bateman et al. (2017). Argininosuccinate Synthase 1 is a Metabolic Regulator of Colorectal Cancer Pathogenicity. *ACS Chem Biol.* 12(4):905-911. Thus, treatment of colorectal cancer can include inhibition of ASS1.

Without wishing to be bound by theory, ASS1 contributes to gastric cancer invasion and progression by modulating autophagy. Further, ASS1 is a metabolic regulator of colorectal cancer pathogenicity. Accordingly, in various embodiments, the present invention relates to the identification of compounds that promote recruitment and/or degradation of ASS1.

In various embodiments, the present invention relates to a method for identifying a candidate compound by obtaining a test compound having the ability to bind to CRBN; contacting the test compound with CRBN in the presence of ASS1; assaying a recruitment and/or degradation of ASS1; and classifying the test compound as a candidate compound if high or increased recruitment and/or degradation of ASS1 is detected.

In various embodiments, the present invention relates to a method for making a candidate composition, comprising: identifying a candidate compound and formulating the candidate composition for use in a therapy, where the identifying is by obtaining a test compound having the ability to bind to CRBN, contacting the test compound with CRBN in the presence of ASS1, assaying for recruitment and/or degradation of ASS1, and classifying the test compound as a candidate compound if high or increased recruitment and/or degradation of ASS1 is detected.

In embodiments, the high or increased recruitment and/or degradation of ASS1 is relative to recruitment and/or degradation of a substrate and/or neosubstrate of CRBN that is not ASS1 when in the presence of CRBN that is contacted with the test compound, the substrate and/or neosubstrate of CRBN that is not ASS1 being is selected from Ikaros (IKZF1), Helios (IKZF2), Aiolos (IKZF3), Eos (IKZF4), Pegasus (IKZF5), CSNK1A, CK1a, and ZFP91.

In embodiments, the high or increased recruitment and/or degradation of ASS1 is relative to an amount of recruitment and/or degradation of ASS1 in a reference sample lacking the test compound.

In embodiments, the candidate compound identified if high or increased recruitment and/or degradation of ASS1 is detected is suitable for use in treating a cancer, such as, for example, a cancer is dependent on ASS1, such as, for example gastric cancer or colorectal cancer.

EXAMPLES

Example 1: Discovery of Recombinant Argininosuccinate Synthase 1 (ASS1) as a Substrate/Neosubstrate Directly Recruited to Cereblon by Molecular Glues In order to identify ligand-induced CRBN substrates, or neosubstrates, a MAPPIT cell microarray screen was performed using the procedure described in Lievens, et al. "Proteome-scale binary interactomics in human cells." Molecular & Cellular Proteomics 15. 12 (2016): 3624-3639. The traditional MAPPIT assay has been used to monitor protein-protein interactions. A bait protein (protein A) is expressed as a fusion protein in which it is genetically fused to an engineered intracellular receptor domain of the leptin receptor, which is itself fused to the extracellular domain of the erythropoietin (Epo) receptor. Binding of Epo ligand to the EpoR component results in activation of receptor-associated intracellular JAK2. However, activated JAK2 cannot activate the leptin receptor to trigger STAT3 binding and its phosphorylation because its tyrosine residues, normally phosphorylated by activated JAK2, have been mutated. Reconstitution of a JAK2 phosphorylatable STAT3 docking site is instead created through interaction of a protein B with protein A, whereby protein B is fused to a cytoplasmic domain of the gp130 receptor (which now harbors appropriate tyrosine resides recognized by the activated JAK2 kinase). Thus, physical interaction of protein A with protein B reconstitutes and EPO triggered JAK2-STAT3 signaling pathway activation. Activation of STAT3 can be monitored by introduction of a STAT3-responsive reporter gene, including a luciferase-encoding gene or a gene encoding a fluorescent marker such as GFP or some other type of Fluorescent Protein (EGFP etc.). In this manner, the MAP-PIT assay provides a versatile assay to assess such recombinant protein-protein interactions in intact cells. cDNA libraries encoding protein B fusion proteins (i.e., protein B-gp130 fusion proteins) can be screened with this method to identify any proteins that are able to interact with a protein A bait (fused to the EpoR-LepR fusion protein).

In this Example 1, we used a derivative of the MAPPIT assay that we developed specifically for use in determining CRBN-ligand induced protein interactions, i.e. using a specific CRBN bait protein (fused to the mutated leptin receptor in this system) and assaying for ligand-dependent induction of protein complex formation, the complex including a protein B fusion protein (protein B-gp130 fusion protein). In this manner we were able to screen cDNA libraries for ligand-dependent candidate CRBN neosubstrates. This assay has also been used for characterization of such interactions (or lack thereof) in other Examples in this document (Example 5).

In brief, HEK293T cells were transfected with a CRBN bait expression plasmid (pSEL-CRBN) and added to microarray screening plates containing a prey expression plasmid collection covering over 15K ORFs. Twenty-four hours after transfection cells were differentially stimulated with erythropoietin with and without the CRBN ligand CC-220 (10 μM), and reporter signal (GFP-like fluorescence reporter) was read out 48 hours later. Fluorescence intensity data was analyzed as reported previously, yielding the dot plot shown in FIG. 1. Top ranked hits included Ikaros (IKZF1), a known CC-220-induced CRBN substrate. In this study, as shown, we also identified Argininosuccinate Synthase 1 (ASS1) as a novel CC220-induced CRBN neosubstrate. ASS1 was also identified in this manner with compounds such as lenalidomide, another type of IMiD binding to CRBN (commercially known as Revlimid™, a well-known anticancer drug).

Figure 2:
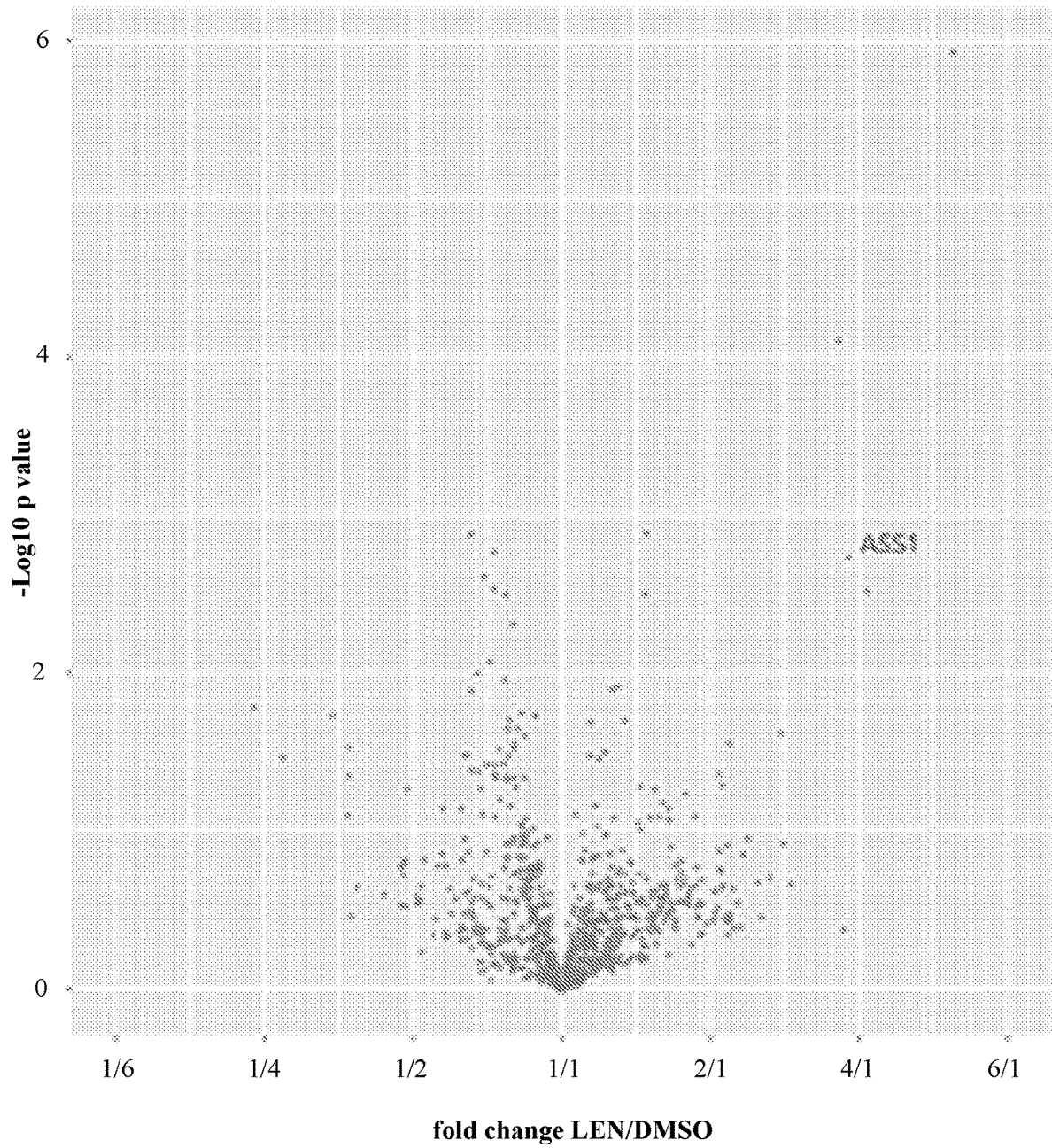
FIG. 2 Identification of endogenous ASS1 as a molecular glue-induced CRBN neosubstrate. Endogenous ASS1 was identified as a lenalidomide-induced interactor of CRBN using a "protein trap" technology known as ViroTrap and described previously (Eyckerman, et al. "Trapping mammalian protein complexes in viral particles," *Nature Communications* 7: 11416 (2016), the entire contents of which are herein incorporated by reference) and in more detail in Example 2. Binding of ASS1 to CRBN in response to lenalidomide was detected by identifying ASS1 tryptic peptides from a virus-like particle containing cellular CRBN recruited into such particle (including any associated protein or proteins) during the particle budding process. Accordingly, shown is a volcano plot of tryptic peptide identities for peptides isolated from CRBN containing virus-like particles isolated with the ViroTrap procedure from cells exposed to lenalidomide (LEN) versus DMSO control vehicle (to identify LEN-induced CRBN interactors). Tryptic peptide signal (log 10 p value) corresponding to ASS1, and relative fold change in ASS1 tryptic peptide signal in presence of lenalidomide (LEN) or DMSO control vehicle (X-axis) identifies endogenous ASS1 as a LEN-induced CRBN interactor.

Example 2: Discovery of Endogenous Argininosuccinate Synthase 1 (ASS1) as a Substrate/Neosubstrate Recruited to Cereblon by Molecular Glues In this study we set out to confirm that an IMiD such as lenalidomide could induce recruitment to CRBN of endogenous ASS1. For this purpose we used a previously described method known as ViroTrap (Titeca, et al. "Analyzing trapped protein complexes by Virotrap and SFINX." Nature Protocols 12.5 (2017): 881). With this method, CRBN is expressed as a fusion protein with the viral protein HIV-GAG. HIV-GAG, when expressed in cells, such as HEK293, is capable of triggering the formation of virus-like particles that bud off the cells. In the particle, the HIV-GAG protein is oriented towards the center of the particle. When fused to CRBN, CRBN is displayed also in the internal core of the particle. In the event the GAG-CRBN fusion interacts with proteins inside the cells, such proteins are dragged/trapped along with GAG-CRBN into the virus-like particles. In this manner, endogenous proteins that interact with CRBN, in presence or absence of a CRBN-ligand, can be identified. This is achieved by lysis of the particle and a standard mass-spectrometry analysis of tryptic digest of the sample. Subtractive analysis will then identify proteins that are specifically associated with the particle in response to a CRBN-ligand such as lenalidomide. Using this method, we discovered that lenalidomide induced the association of endogenous ASS1 with CRBN, i.e., ASS1 tryptic digests identified ASS1 as a protein recruited into the viral particle in dependence of lenalidomide. In short, HEK293T cells were co-transfected with a gag-CRBN bait expression plasmid and a Flag-VSV-G encoding plasmid (for particle purification from the cell medium), and incubated for 24 hours. Next, cells were treated with 10 μM lenalidomide or DMSO as negative control. Twenty-four hours after compound addition, virus-like particles (VLPs) were isolated from the cell supernatant using anti-Flag coated magneto-beads. After elution from the beads using Flag peptide, purified VLPs were lysed, and the protein content was digested overnight with trypsin. The peptide samples were analyzed through LC-MS/MS and data from triplicate samples was processed using the MaxQuant software package and a volcano plot (FIG. 2) was generated with the Perseus tool. ASS1 was identified among the top hits exhibiting a high signal ratio for the lenalidomide versus DMSO control samples and a low p-value.

Figure 3B:
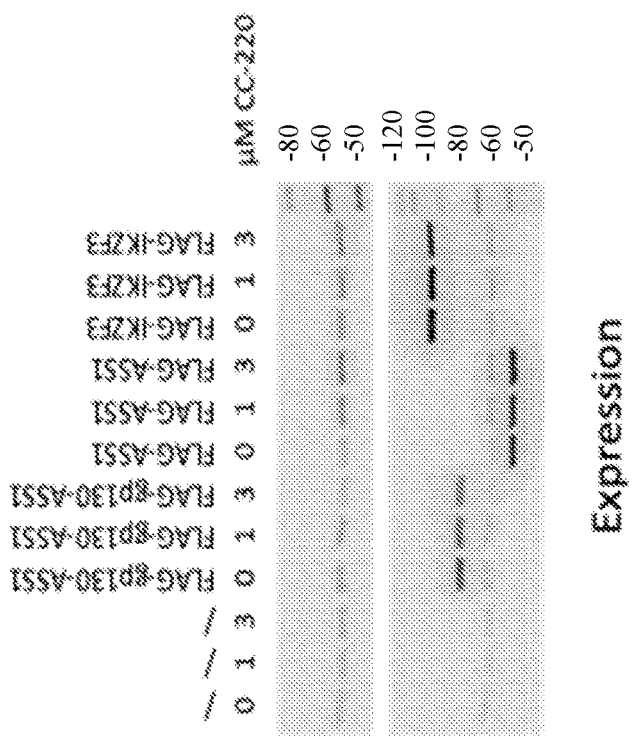
FIGS. 3A-B Ligand-induced CRBN-ASS1 interaction in living cells—as assessed by co-immunoprecipitation analysis. In this study we examined the ability of Flag-tagged ASS1 (or Flag tagged gp130-ASS1 fusion protein, as identified in the assay described in FIG. 1) and HA-tagged CRBN to interact in living cells upon transfection and expression of each construct in HEK293T cells—in the presence or absence of the CRBN IMiD ligand CC220. Ability of HA-tagged CRBN to interact in response to CC220 with the known CRBN neosubstrate IKZF3 was also examined (with IKZF3 expressed as a Flag-tagged IKZF3 fusion protein).
Figure 3A:
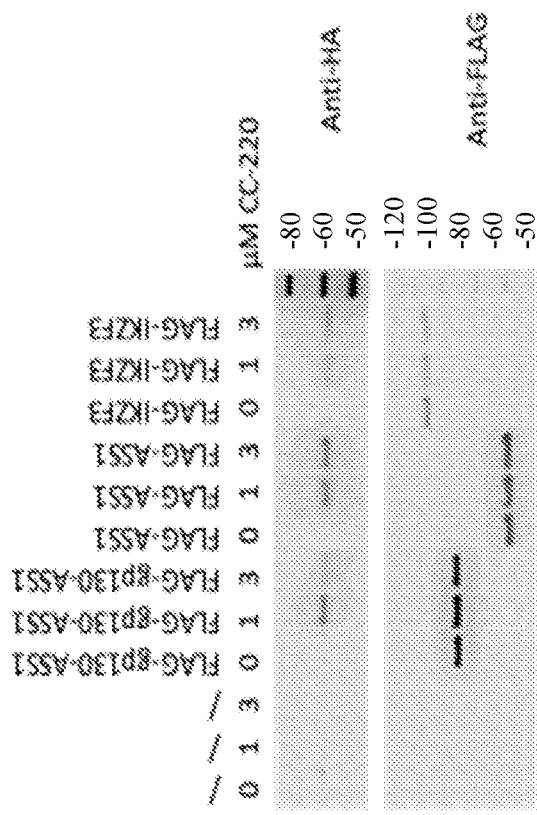
Figure 4:
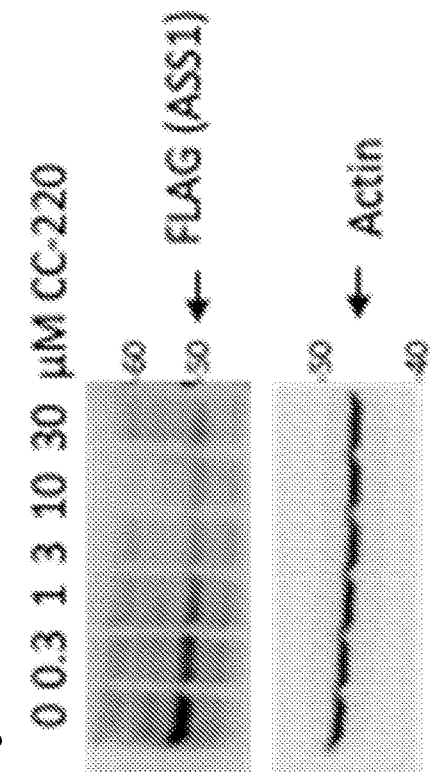
FIG. 4 Ligand-induced recruitment of ASS1 to CRBN is associated with degradation of ASS1 in living cells. In this study we examined whether ligand-induced recruitment of ASS1 to CRBN could lead to subsequent ASS1 degradation (as triggered by interaction with the CRBN E3 ligase). HEK293 cells were co-transfected with cDNA constructs encoding Flag-tagged ASS1 and HA-tagged CRBN and exposed to increasing concentration of CC220 for 24 hours. Samples were generated for Western blot analysis to determine steady state levels of ASS1 across the different experimental conditions, assessed using and anti-Flag antibody. As shown, loss of ASS1 expression (but not actin control protein expression) was observed specifically in response to CC220 exposure, and in a dose-dependent manner. These results show that ASS1 is a neosubstrate of CRBN and that ligand-induced interaction with CRBN triggers its proteasomal degradation—as observed for some other known CRBN neosubstrates, such as IKZF1/3.

Example 3: Ligand-Induced CRBN-ASS1 Interaction in Living Cells—as Assessed by Co-Immunoprecipitation Analysis In this study we assessed via co-immunoprecipitation of protein complexes the ability of the CRBN ligand CC220 to induce an interaction with ASS1 when expressed in HEK293 cells. Consistent with findings in Example 1 and 2, this alternative approach showed that CC220 specifically induces the recruitment of ASS1 into a CRBN-CC220 complex. Similar observations were made for the known CRBN neosubstrate IKZF3, which was alongside as a positive control. In brief, plasmids encoding (i) FLAG tagged-gp130-ASS1 (version used in the MAPPIT assay in Example 1), (ii) FLAG-tagged-ASS1, or (iii) FLAG-tagged-IKZF3 were transiently co-transfected with HA-tagged-CRBN in HEK293T cells. Twenty-four hours after transfection, cells were treated with different doses (0 μM, 1 μM, and 3 μM) of CC-220 for another 24 hours. The day after, cells were lysed and a $^1/_{10}$ of the lysate was kept for expression analysis of the FLAG-tagged fusion proteins and HA-tagged CRBN (shown in FIG. 3B). Co-IP with anti-FLAG Ab (SIGMA) and Dynabeads Streptavidin T1 (INVITROGEN) was performed with the other $^9/_{10}$ of the lysate (FIG. 3A). After immunoprecipitation, the bound FLAG-proteins, and any associated proteins, were eluted from the beads by elution with FLAG-peptide (SIGMA). Presence of HA-CRBN (FIG. 3A, upper panel), i.e. its recruitment into the FLAG-ASS1 immunoprecipitates, was investigated via SDS-PAGE and Western Blot analysis of the elution sample using an anti-HA Ab (ROCHE). FLAG-tagged ASS1 was detected using an anti-FLAG Ab (SIGMA) respectively (FIG. 3A, lower panel). Expression of all proteins in cell lysates was investigated via SDS-PAGE and Western Blot analysis of the expression lysate with anti-FLAG and anti-HA Ab (SIGMA or ROCHE, respectively), as shown in FIG. 3B.

Example 4: Ligand-Induced Recruitment of ASS1 to CRBN is Associated with Degradation of ASS1 in Living Cells In this study we examined whether CC220 CRBN-ligand-induced recruitment of ASS1 to CRBN could lead to subsequent ASS1 degradation (as triggered by interaction with the CRBN E3 ligase). For this analysis, cells were transfected with FLAG-tagged ASS1 and HA-tagged CRBN encoding constructs, and any change in steady state levels of ASS1 in response to incubation of cells with CC220 for a specified time was assessed by Western blot analysis. The study shows that ASS1 steady state levels of ASS1 indeed decrease in a dose responsive manner in response to CC220, confirming that ligand-induced recruitment of ASS1 to CRBN triggers ASS1 protein degradation. In brief, plasmids encoding FLAG-ASS1 and HA-CRBN were co-transfected in HEK293T cells. Twenty-four hours after transfection, cells were either left untreated or treated with different doses (0.3 µM, 1 µM, 3 µM, 10 µM or 30 µM) of CC-220 for another 24 hours. Next, cells were lysed and a fraction of the lysate was analyzed via SDS-PAGE and Western Blot analysis with an anti-FLAG antibody (Sigma). As a loading control, Western Blot analysis was performed with an anti-actin antibody (Sigma).

Example 5: Discovery and Characterization of Compounds that Bind to CRBN but Do Not Effectively Recruit CRBN Neosubstrate ASS1 Compared to Known CRBN IMiD Ligands, Such as Lenalidomide/LEN and CC220, or Other CRBN Ligands In this study we performed a comparative study for a series of compounds that bind to CRBN, and their ability to differentially recruit the ASS1 neosubstrate. We found in our studies that known IMiDs, such as Lenalidomide and CC220 (see Examples 1-4) all induce the recruitment of ASS1 to CRBN, and that this is associated with degradation of ASS1 in cells (Example 4). Given that ASS1 is an important cellular protein whose loss of expression has been shown to be associated with defects in cell metabolism and survival, such as T cells of the immune system, we posed the question as to whether it were possible to identify and characterize compounds that bind CRBN but do not recruit ASS1. In summary, this study shows that we could indeed discover CRBN-binders that competed for binding of Lenalidomide to CRBN, are potent binders of CRBN (equivalent or more potent than lenalidomide) in cells but, in contrast to lenalidomide, do not induce recruitment of ASS1. This emphasizes the opportunity of differential screening and characterization in the development of CRBN ligands that avoid an ASS1 recruitment liability. Details of the study are shown in FIGS. 5A-5L, in which we qualify the potency of compounds in a) binding to CRBN in cells, b) inducing recruitment of ASS1 or IKZF1 to CRBN.

Figure 5A:
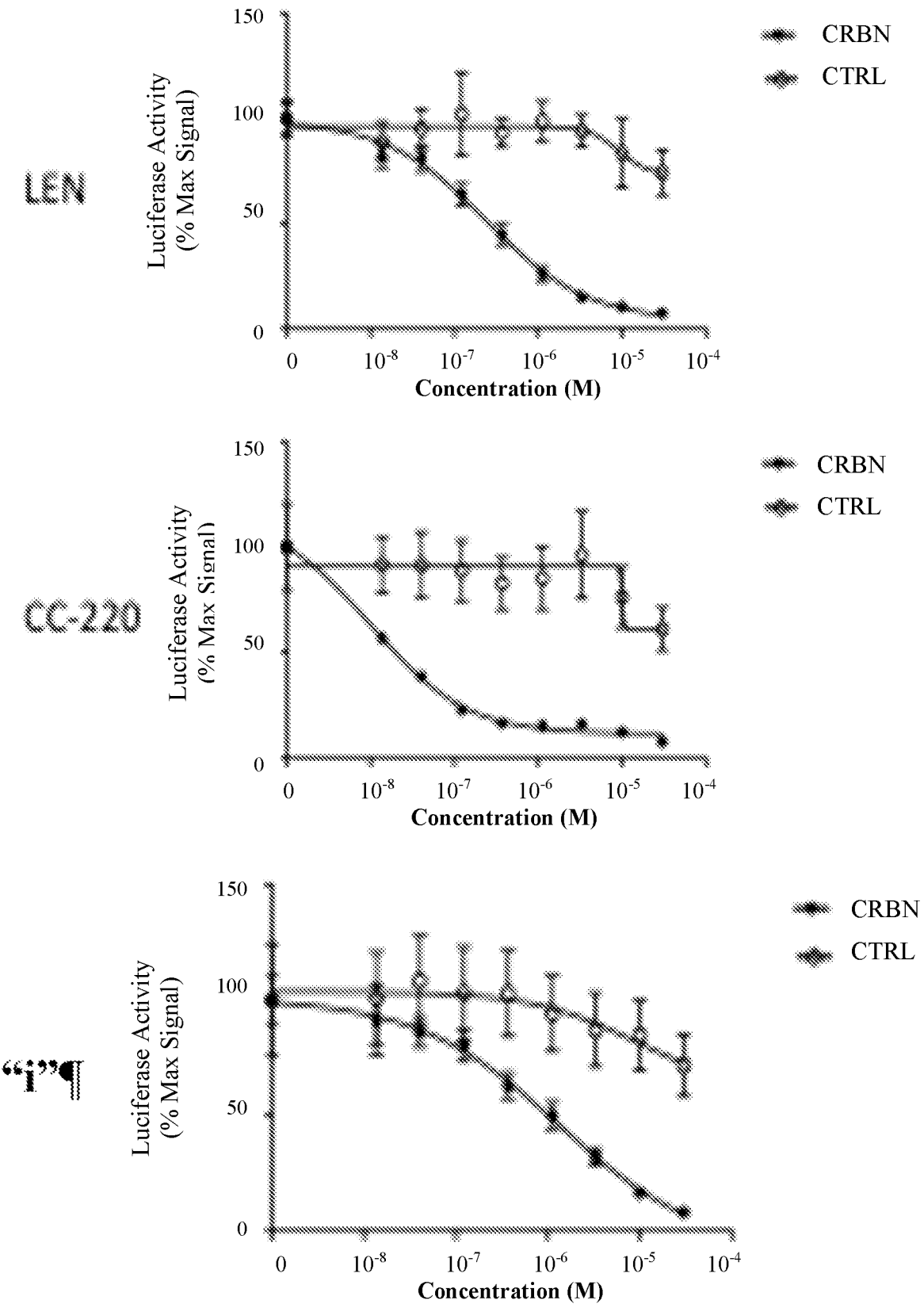
FIGS. 5A-5L. Discovery and characterization of compounds that bind to CRBN but do not effectively recruit CRBN neosubstrate ASS1 compared to known CRBN IMiD ligands, such as Lenalidomide/LEN and CC220, or other CRBN ligands (Roman numeral names on left). In this study we show that it is possible to identify CRBN ligands that bind to CRBN with high potency, even in the IMiD ligand binding pocket as indicated by competition experiments, but do not recruit ASS1. The following experimental set-up was used to first assess CRBN binding efficiency of compounds in living cells: a MAPPIT-like assay, as described in FIG. 1 and relevant method section in Example 1 and Example 5, and in which HEK293 cells were transfected with the appropriate cDNAs encoding transgenes (encoding DHFR and CRBN fusion proteins), was used to generate a positive assay signal as a result of ternary protein/compound complex formation, including a DHFR-fusion protein, a trimethoprim-lenalidomide hybrid ligand (trimethoprim is a ligand for DHFR), and a CRBN-gp130 fusion protein (CRBN binds the ligand lenalidomide)—thus, a DHFR-Trim-Len-CRBN complex formation. Formation of the complex results in activation of a STAT-responsive luciferase reporter gene.
Figure 5B:
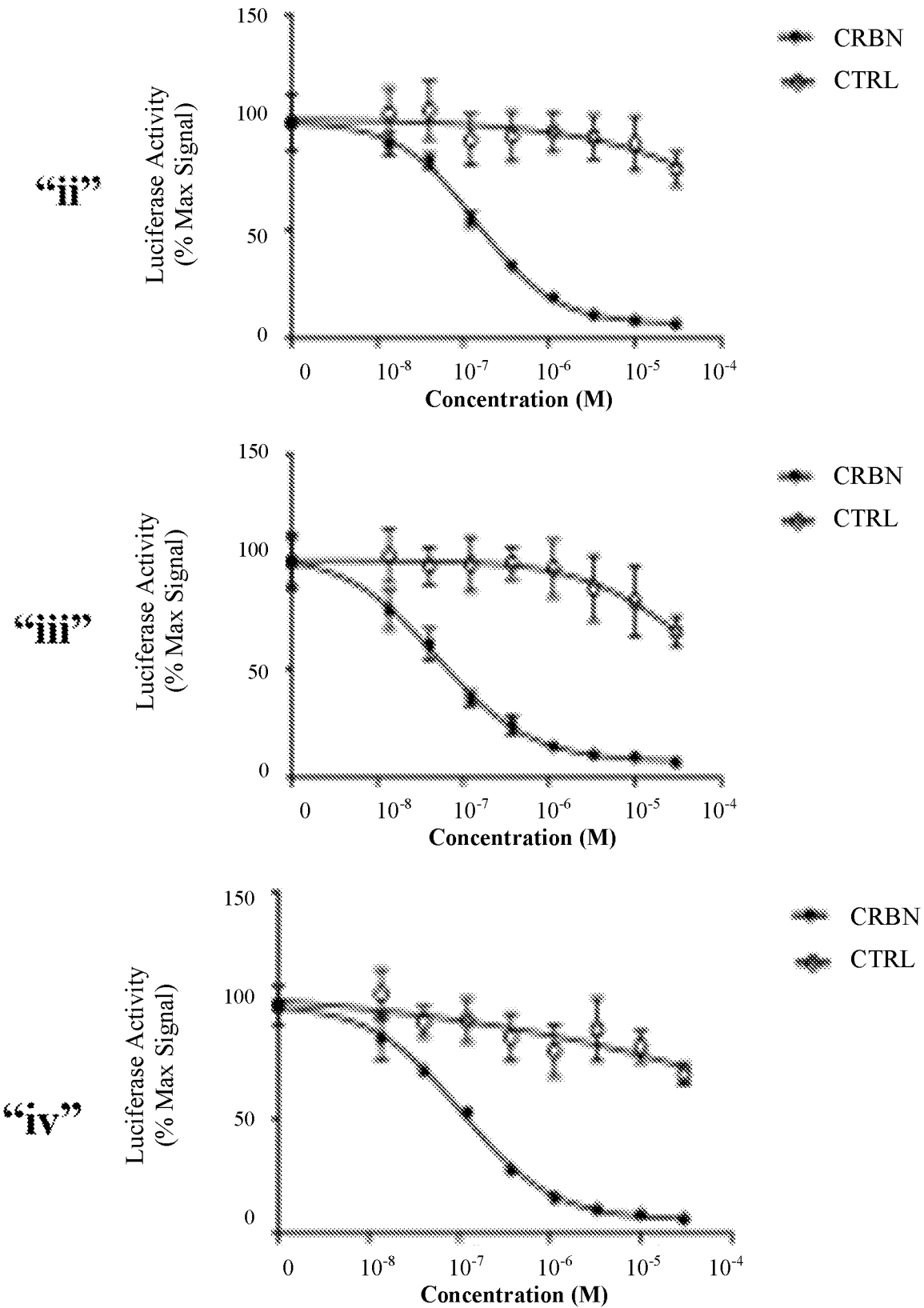
Figure 5C:
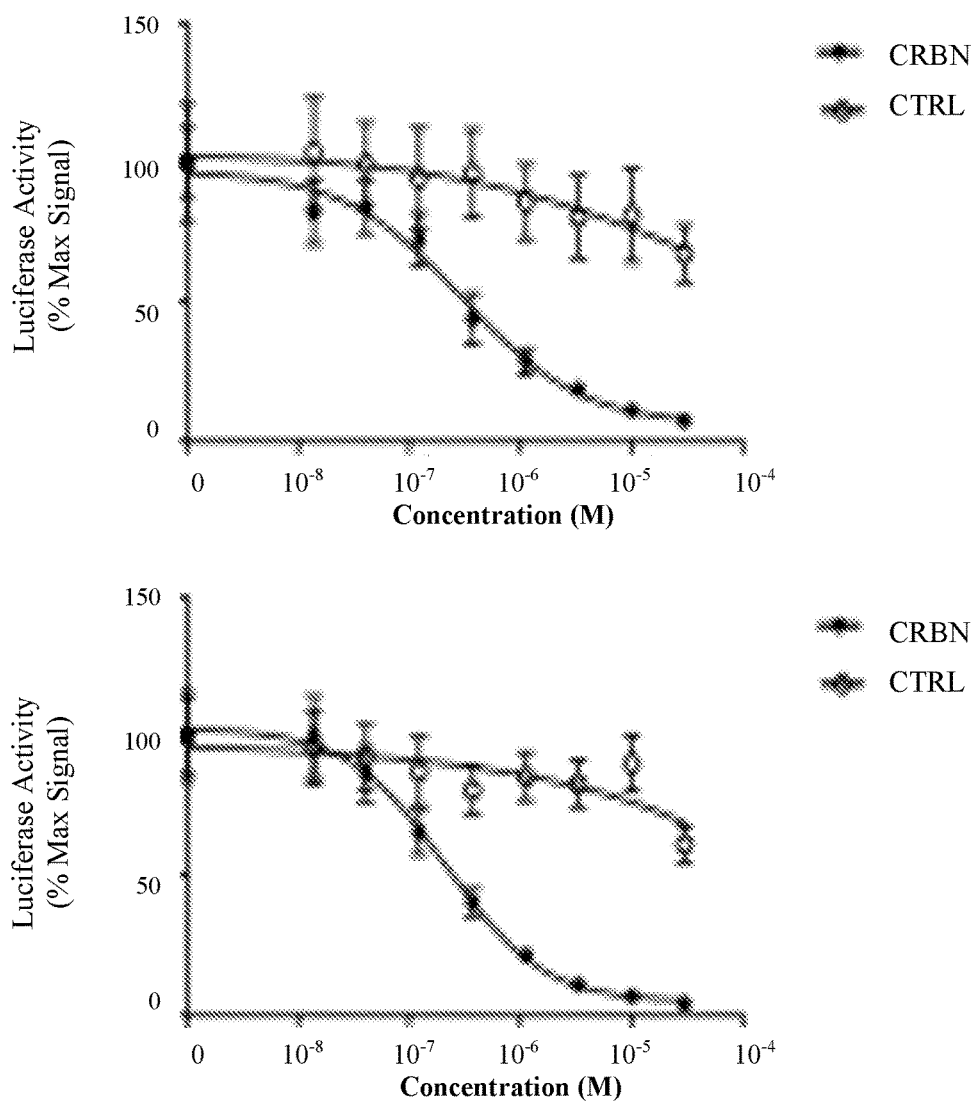
Figure 5D:
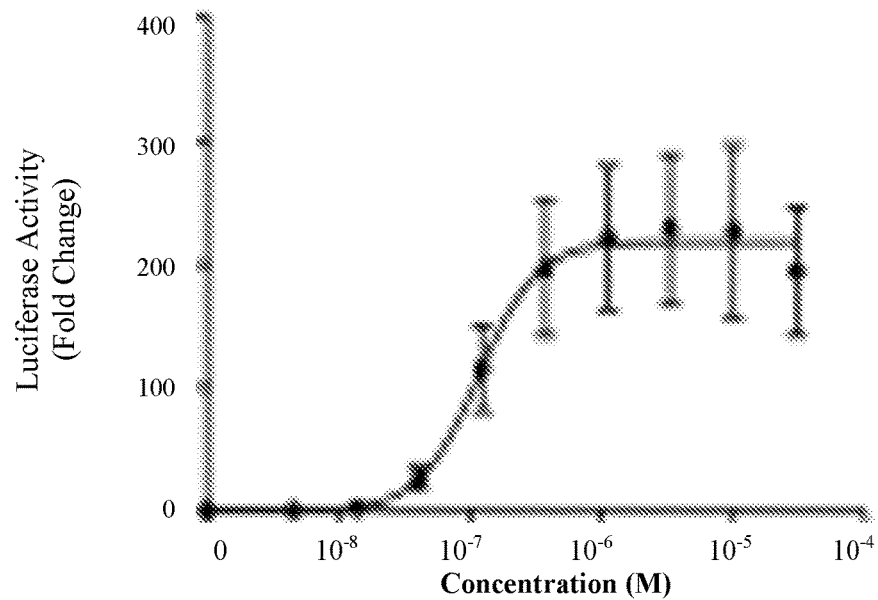
Figure 5D:
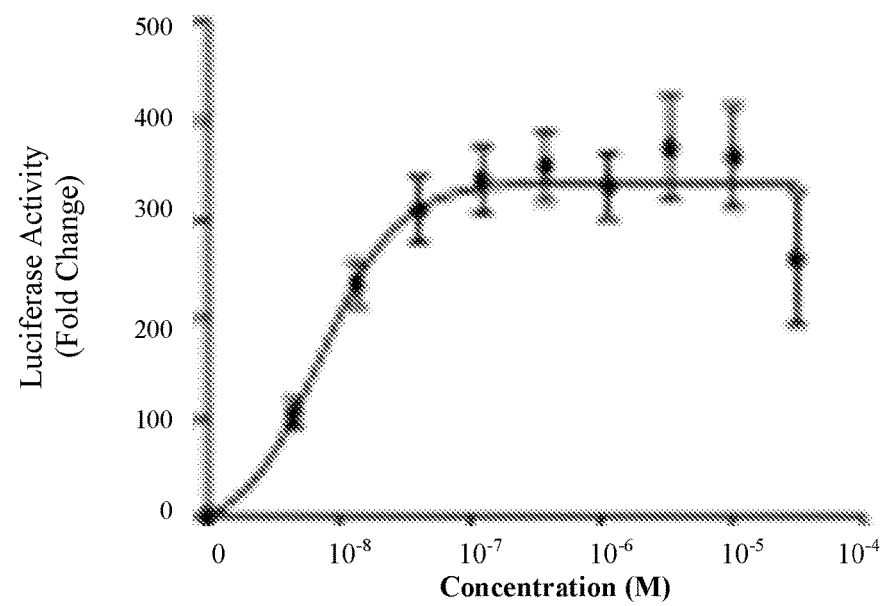
Figure 5E:
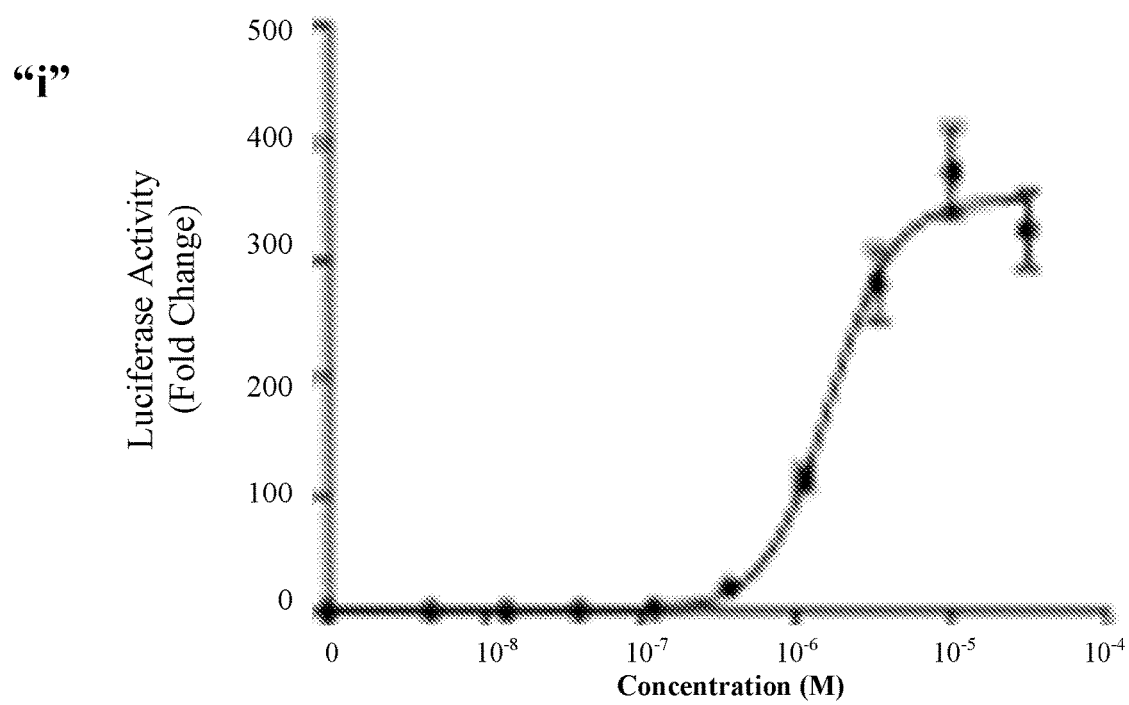
Figure 5F:
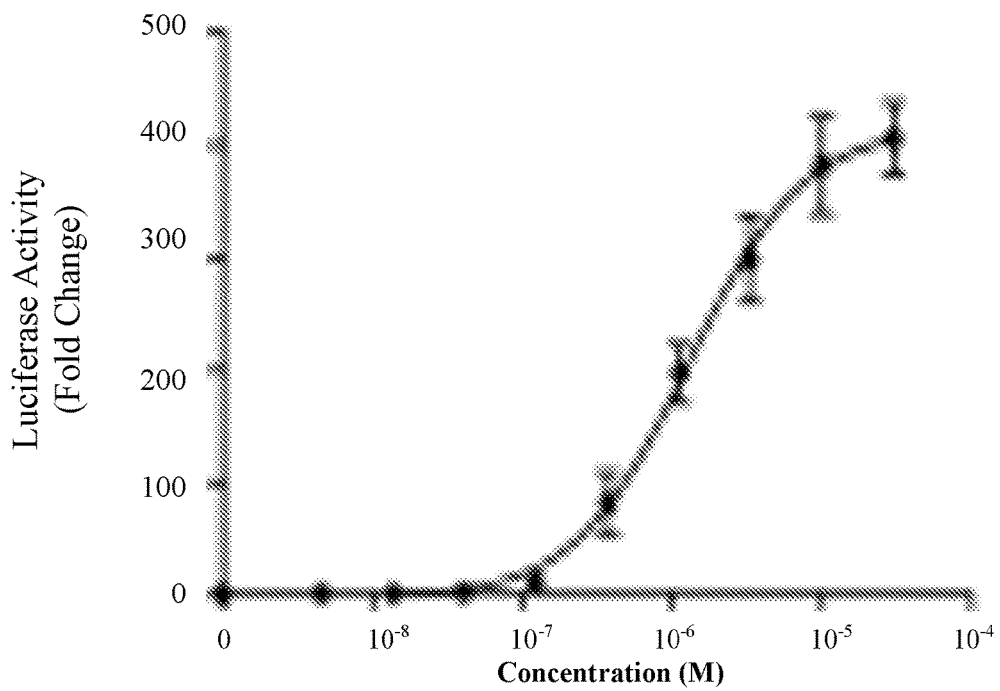
Figure 5F:
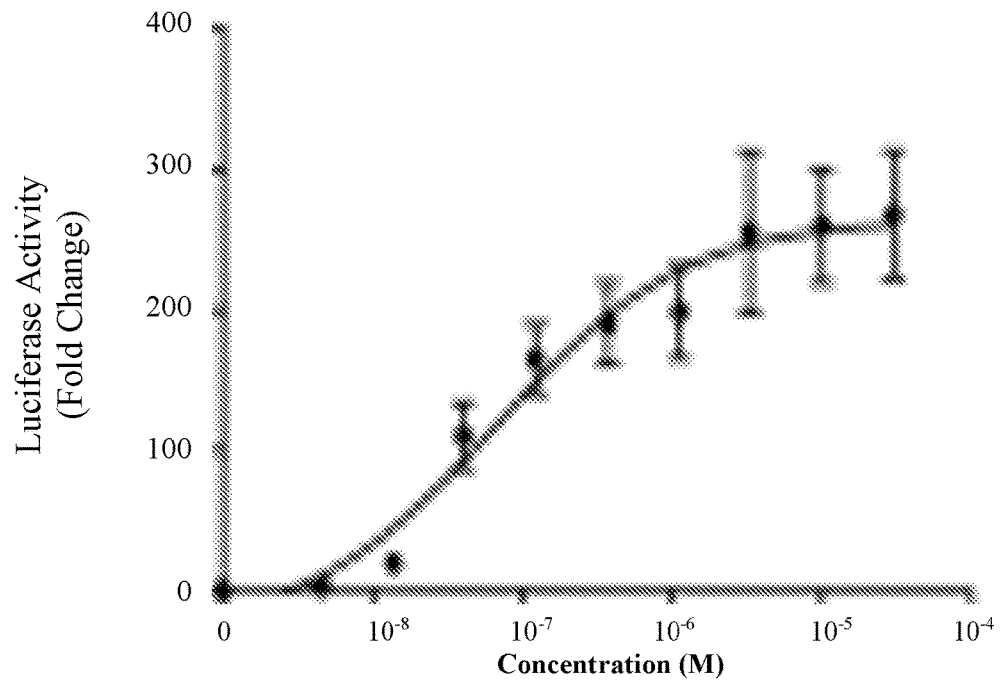
Figure 5G:
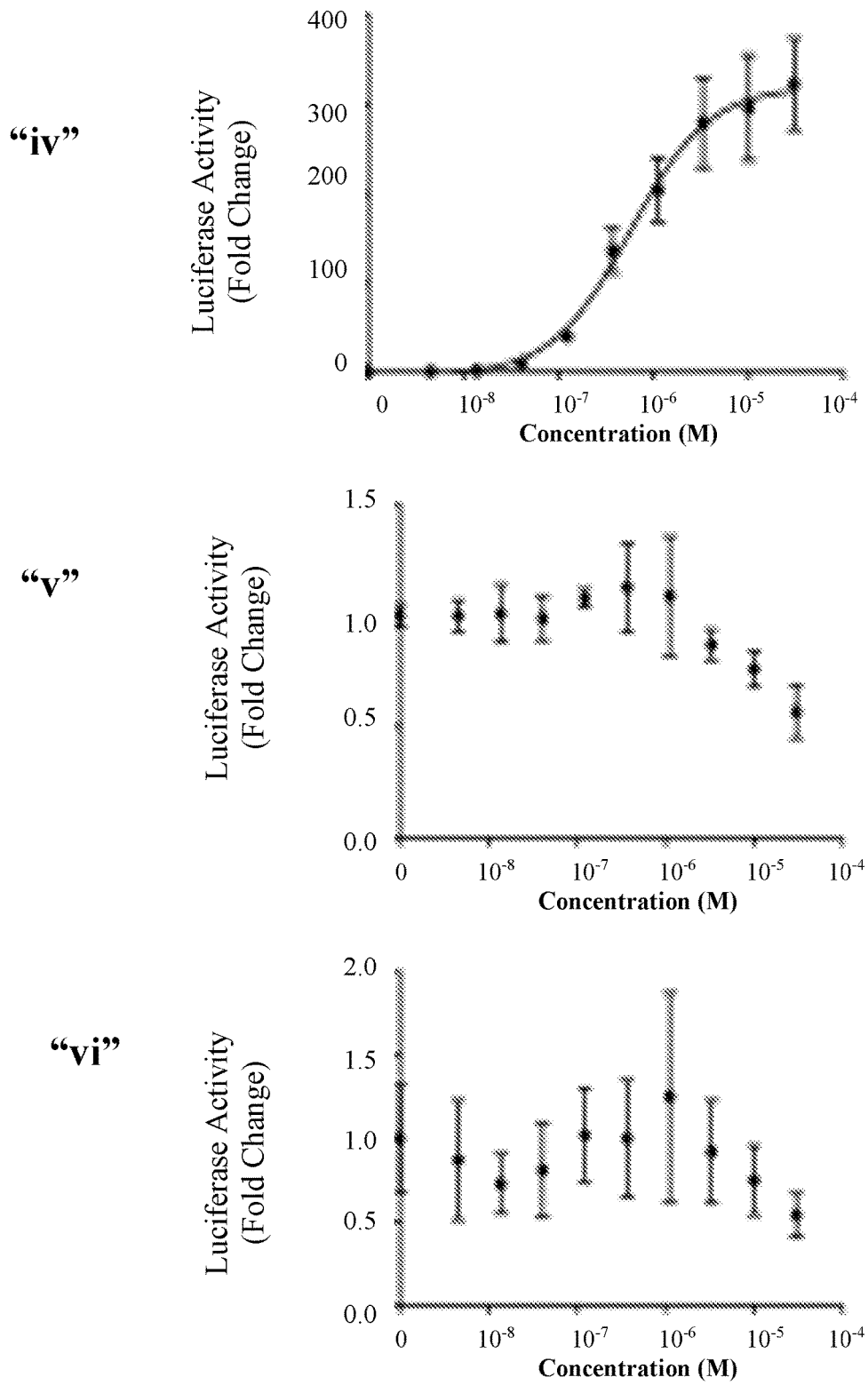
Figure 5H:
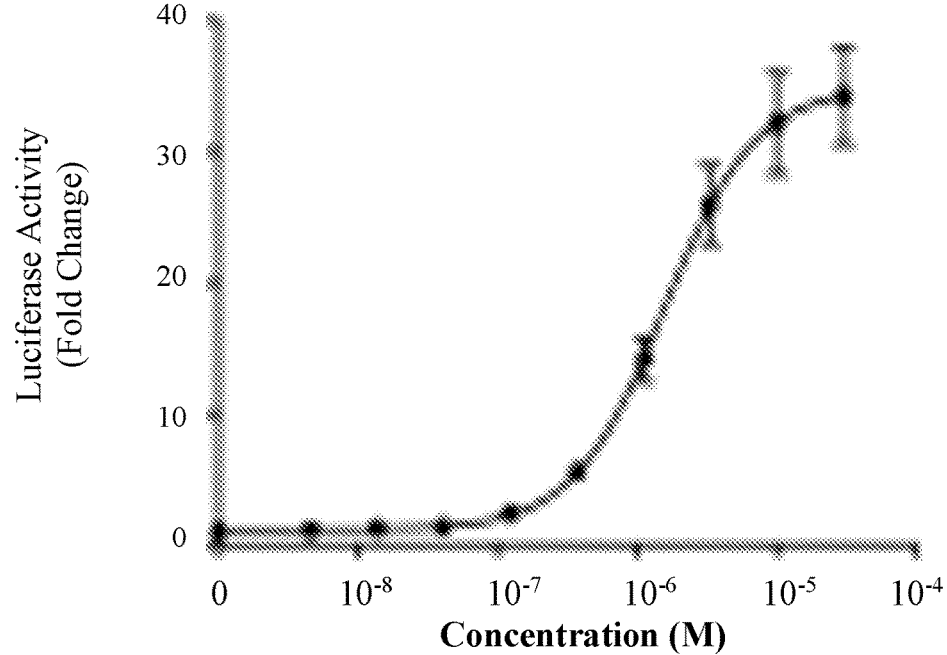
Figure 5H:
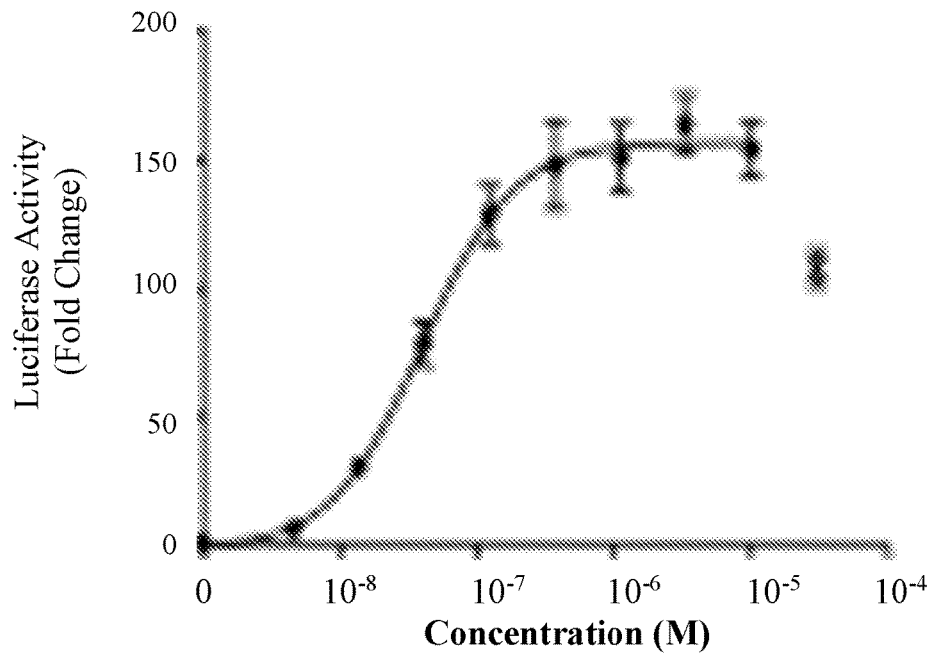
Figure 5I:
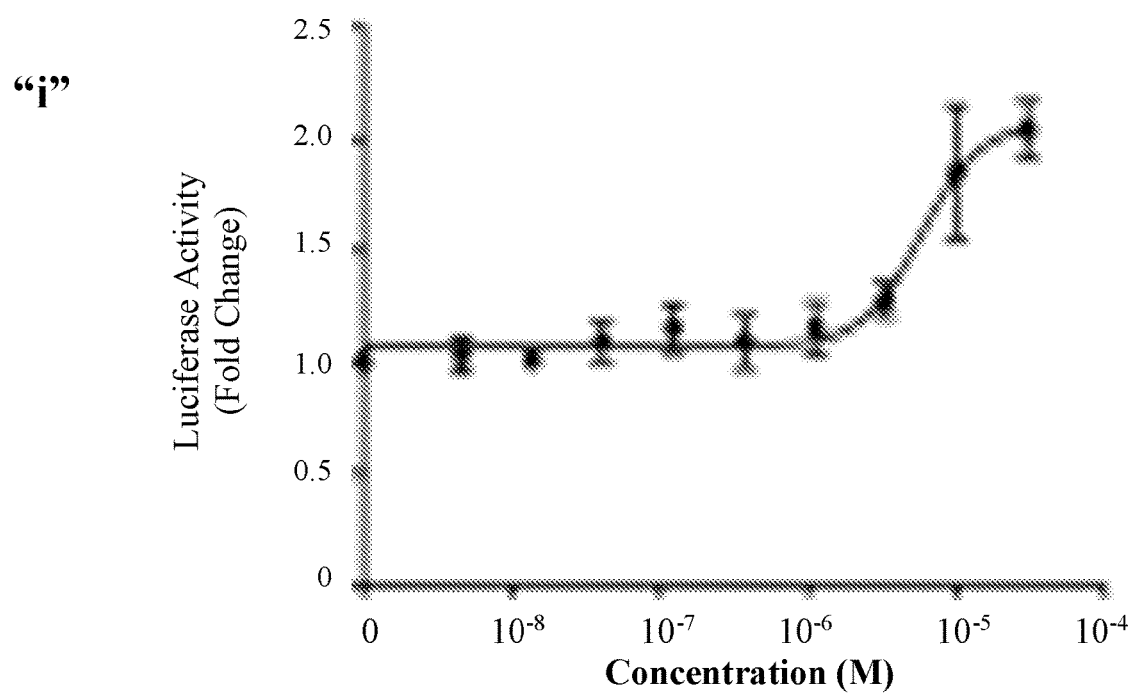
Figure 5J:
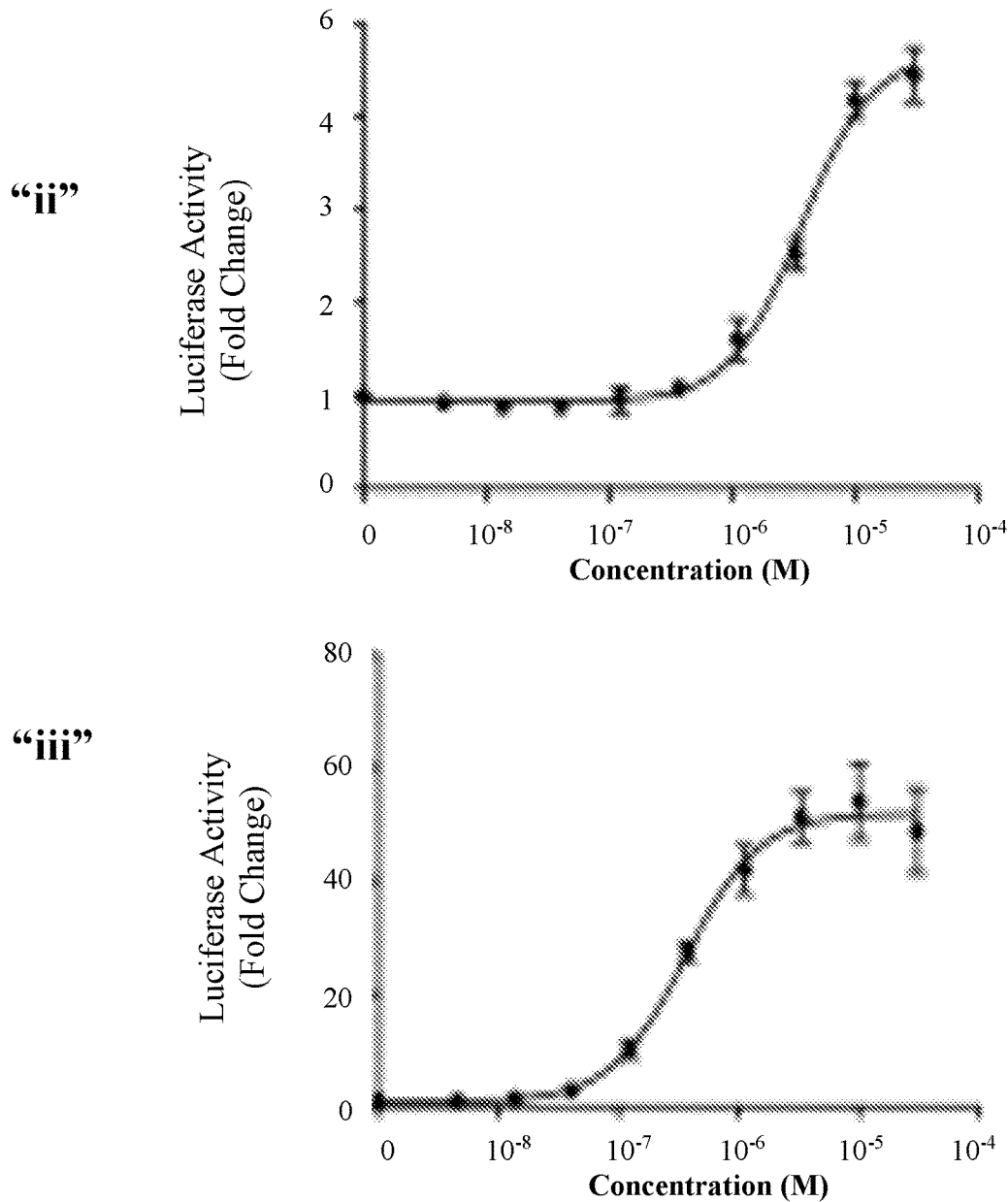
Figure 5K:
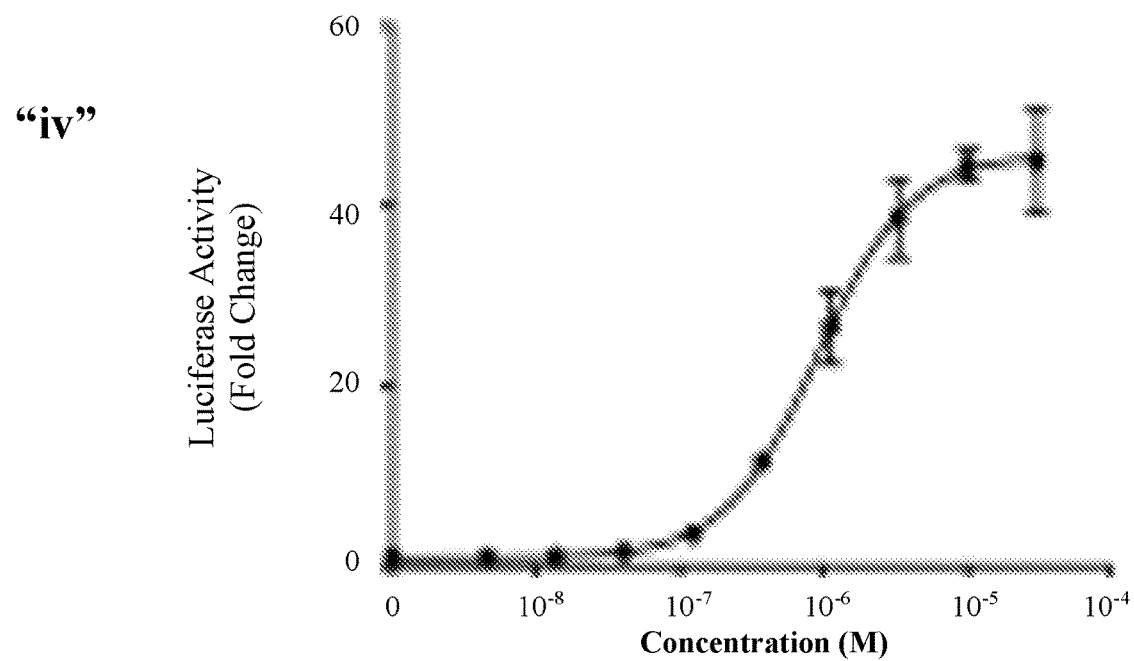
Figure 5L:
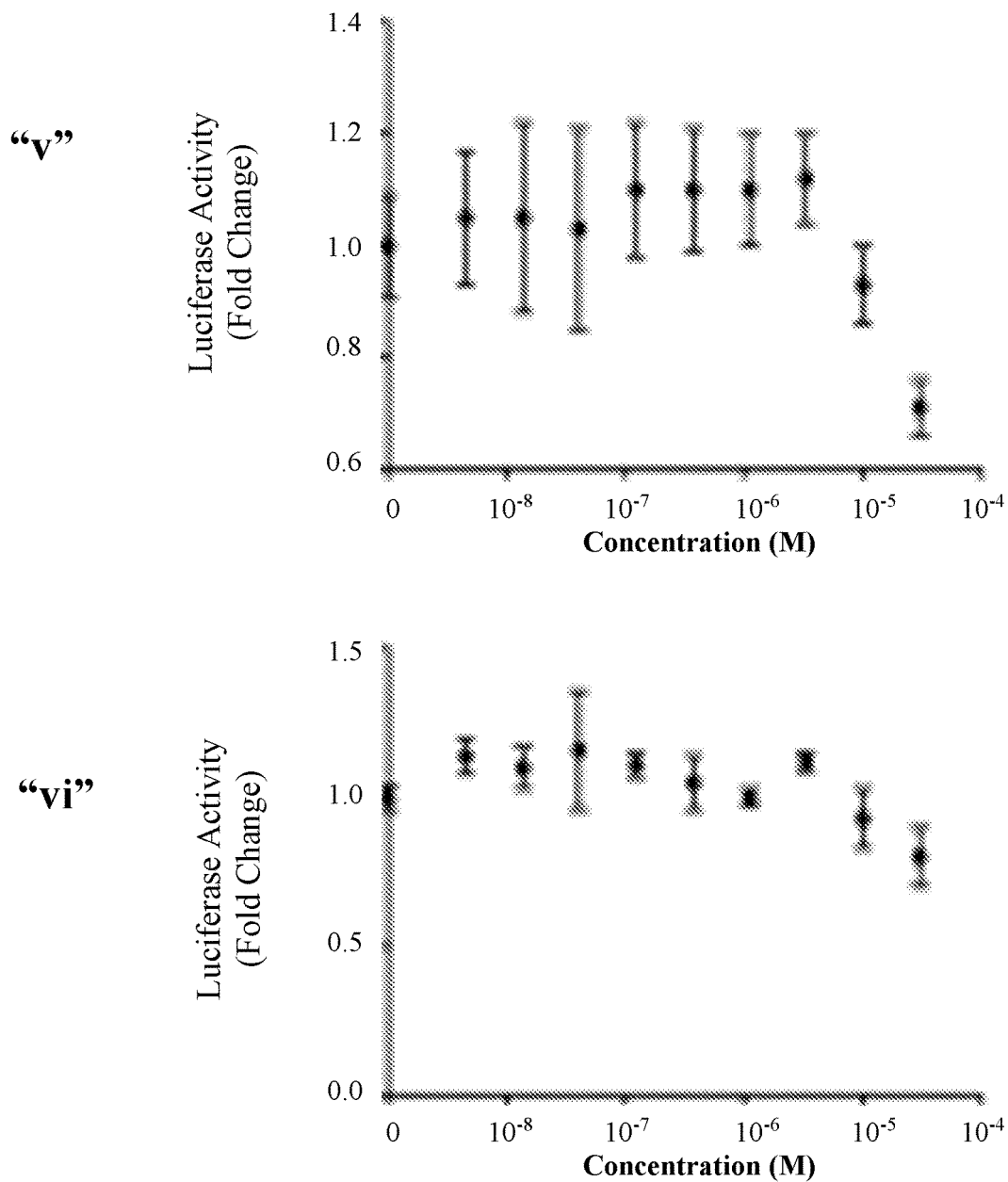

CRBN binding was assessed with a MAPPIT-like assay described in Example 1—by determining ability of test compounds to compete with a Lenalidomide hybrid ligand for binding to CRBN in cells. HEK293T cells were cultured in Dulbecco's modified Eagle's medium supplemented with 10% fetal calf serum, incubated at 37° C., 8% $CO_2$. Cells were transfected with a plasmid encoding E. coli Dihydrofolate Reductase (DHFR) fused to the tails of the cytoplasmic domain of a mutated leptin receptor (pCLG-eDHFR), a plasmid encoding a CRBN prey fused to gp130 cytoplasmic domain (pMG1-CRBN) or a plasmid encoding a REM2 control prey that can directly interact with the leptin receptor of the DHFR fusion protein (pMG1-REM2), and the STAT3 responsive pXP2d2-rPAPI-luciferase reporter plasmid—using a standard transfection method, as described (Lievens, et al. "Array MAPPIT: high-throughput interactome analysis in mammalian cells." Journal of Proteome Research 8.2 (2009): 877-886). Cells were treated with leptin to activate the leptin receptor fusion protein and supplemented with 300 nM trimethoprim-lenalidomide fusion compound (hybrid ligand, where trimethoprim interacts with DHFR and lenalidomide with CRBN) without or with the indicated dose of test compound at 24 hours after transfection. Luciferase activity, induced by formation of the ternary complex including DHFR-trimethoprim-lenalidomide-CRBN, and consequential activation of STAT3 signaling, was measured 24 hours after compound treatment using the Luciferase Assay System kit (PROMEGA, Madison, WI) with an Ensight plate reader (PERKIN ELMER LIFE SCIENCES, Waltham, MA). Data points in FIGS. 5A-5C represent the average luciferase activity of triplicate samples derived from cells treated with leptin+test compound for the REM2 control (CTRL) or cells treated with leptin+hybrid ligand+test compound (CRBN) relative to leptin (CTRL) or leptin+hybrid ligand (CRBN) only treated samples (the signals obtained in absence of added test compound for both cases is set at 100% of luciferase activity on y-axis). Error bars represent standard deviations. Curves were fit using 4-parameter nonlinear regression in GRAPHPAD PRISM software. As shown in FIGS. 5A-5C, known IMiD compounds, such a lenalidomide and CC220 specifically inhibit hybrid-ligand induced luciferase reporter activation in a dose dependent manner. This reflects effective competition for binding to CRBN and prevention of binding of hybrid ligand to CRBN (hence inhibition of assay signal).

FIGS. 5D-5G and FIGS. 5H-5L address the question whether any of test compounds, characterized in FIGS. 5A-5C to effectively bind to CRBN in cells, to act as molecular glues and to induce recruitment of ASS1 or IKZF1 to CRBN. For this analysis HEK293T cells were cultured in Dulbecco's modified Eagle's medium supplemented with 10% fetal calf serum, incubated at 37° C., 8% $CO_2$. Cells were transfected with a plasmid encoding a CRBN bait fused to the cytoplasmic domain of the leptin receptor, which itself is fused to the extracellular domain of the erythropoietin (EPO) receptor (pSEL-CRBN). The extracellular EPO receptor domain can be used interchangeably with the extracellular leptin receptor domain (as used in FIGS. 5A-5C) to promote receptor/receptor-associated JAK2 activation (with EPO or Leptin, respectively). In addition, cells were transfected with a plasmid encoding IKZF1 (isoform 7) fused to a gp130 cytoplasmic domain (pMG1-IKZF1 (iso7)) or a plasmid encoding an ASS1 fused to cytoplasmic domain of gp130 (pMG1-ASS1), and a STAT3-responsive luciferase-encoding reporter plasmid (pXP2d2-rPAPI-luciferase reporter plasmid), as described (Lievens, et al. "Array MAPPIT: high-throughput interactome analysis in mammalian cells." Journal of Proteome Research 8.2 (2009): 877-886). Cells were treated with erythropoietin (EPO) without or with the indicated dose of test compound at 24 hours after transfection. Luciferase activity was measured 24 hours after test compound treatment using the Luciferase Assay System kit (PROMEGA, Madison, WI) with an Ensight plate reader (PERKIN ELMER LIFE SCIENCES, Waltham, MA). Data points depict fold induction of the average luciferase activity of triplicate samples from EPO+test compound treated cells versus EPO only treated cells. Error bars represent standard deviations. Curves were fit using 4-parameter nonlinear regression in GRAPHPAD PRISM software. As shown in both FIGS. 5D-5G and FIGS. 5H-5L, we could identify compounds that, despite binding to CRBN efficiently, did not induce recruitment of ASS1 compared to the known IMiDs, including lenalidomide and CC220.

Table 1, summarizes results of FIGS. 5A-5L. Indicated is the potency/efficiency of compound binding to CRBN, computed as an IC50 derived from the competition analysis in FIGS. 5A-5C (dose-response curves). Also shown is the maximal luciferase reporter induction achieved at any dose for either the IKZF1 or ASS1 recruitment test cases. Compounds "v" and "vi", which are as potent CRBN binders as LEN, do not recruit ASS1 (or IKZF1) targets at concentrations as high as 30 micromolar. As shown, different patterns of recruitment can be observed, and deficiency of ASS1 recruitment selectively monitored in comparative analysis for evolution of compounds with dialed-out target recruitment liabilities (i.e., ASS1 recruitment).

TABLE 1

| Test Compound | CRBN binding ($IC_{50}$/μM) | IKZF1 mediated luciferase reporter (max fold induction) | ASS1 mediated luciferase reporter (max fold induction) |
|---|---|---|---|
| LEN | 0.243 | 218 | 73 |
| CC-220 | 0.01 | 338 | 146 |
| "i" | 1.3 | 352 | 2 |
| "ii" | 0.145 | 417 | 5 |
| "iii" | 0.05 | 261 | 52 |
| "iv" | 0.11 | 320 | 46 |
| "v" | 0.3 | 1 | 1 |
| "vi" | 0.21 | 1 | 1 |

Figure 6:
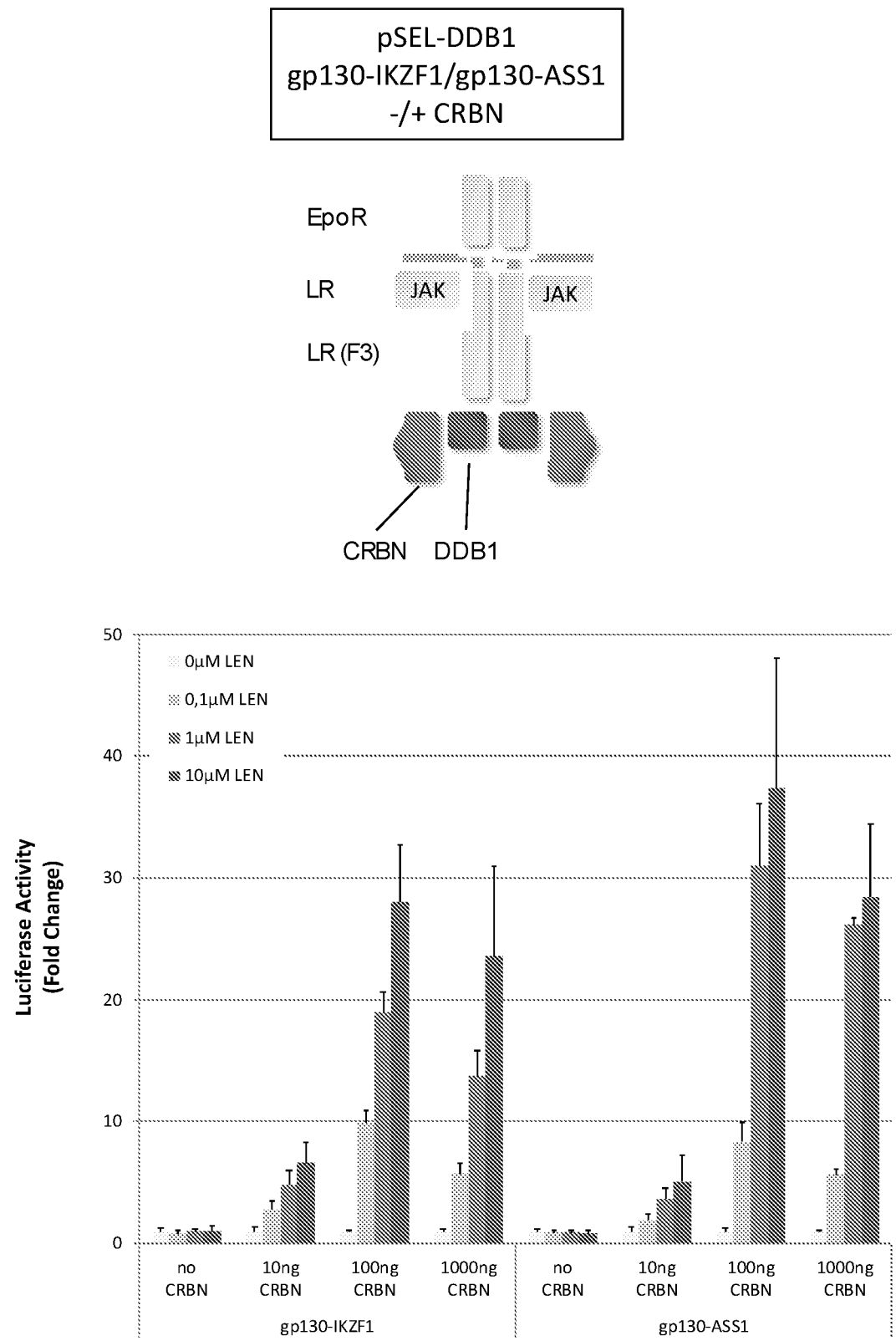
FIG. 6 shows molecular glue-induced CRBN-ASS1 interaction can be detected using an alternative MAPPIT assay configuration applying a DDB1 receptor fusion. An alternative CRBN substrate binding assay was tested where DDB1 was fused to the MAPPIT chimeric receptor construct (pSEL-DDB1) and an unfused CRBN bait protein was co-expressed along with the substrate gp130 fusion protein, either IKZF1 (gp130-IKZF1) or ASS1 (gp130-ASS1). In the absence of CRBN co-expression ('no CRBN'), no lenalidomide (LEN)-induced signal could be observed. However, when an unfused CRBN expression construct was co-transfected, a LEN-dependent signal was obtained for both the IKZF1 and ASS1 interaction.

Example 6: Detection of Compound-Induced CRBN-ASS1 Interaction Using a DDB1 MAPPIT Receptor Fusion Construct As it may be advantageous to test compound-induced CRBN-substrate interactions using an unfused version of the CRBN bait, we developed a MAPPIT-derivative assay where DDB1 is fused to the MAPPIT chimeric receptor construct rather than CRBN. DDB1 is an adaptor protein that connects CRBN to the core E3 ubiquitin ligase complex scaffold subunit CUL4A or CUL4B (Cullin4A or Cullin 4B). HEK293T cells were transfected with a plasmid encoding DDB1 tethered to a MAPPIT receptor fusion containing the EPO receptor extracellular domain (pSEL-DDB1), a plasmid encoding a CRBN substrate protein (IKZF1 isoform 7 or ASS1) fused to the partial gp130 domain and a STAT3-responsive luciferase-encoding reporter plasmid (pXP2d2-rPAPI-luciferase reporter plasmid), as described (Lievens, et al. "Array MAPPIT: high-throughput interactome analysis in mammalian cells." Journal of Proteome Research 8.2 (2009): 877-886). In addition, cells were also co-transfected with different amounts of an unfused CRBN expression construct. Cells were treated with EPO without or with the indicated dose of lenalidomide (LEN) at 24 hours after transfection. Luciferase activity was measured 24 hours after test compound treatment using the Luciferase Assay System kit (PROMEGA, Madison, WI) with an Ensight plate reader (PERKIN ELMER LIFE SCIENCES, Waltham, MA). Data points depict fold induction of the average luciferase activity of triplicate samples from EPO+test compound treated cells versus EPO only treated cells. Error bars represent standard deviations. As shown in FIG. 6, a robust lenalidomide-dependent MAPPIT signal is obtained for both IKZF1 and ASS1 interactions, but only in the presence of co-expressed unfused CRBN, indicating that the signal is mediated by binding of the substrate gp130 fusion proteins to CRBN.

EQUIVALENTS

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

Those skilled in the art will recognize, or be able to ascertain, using no more than routine experimentation, numerous equivalents to the specific embodiments described specifically herein. Such equivalents are intended to be encompassed in the scope of the following claims.

INCORPORATION BY REFERENCE

All patents and publications referenced herein are hereby incorporated by reference in their entireties.

The publications discussed herein are provided solely for their disclosure prior to the filing date of the present application. Nothing herein is to be construed as an admission that the present invention is not entitled to antedate such publication by virtue of prior invention.

As used herein, all headings are simply for organization and are not intended to limit the disclosure in any manner. The content of any individual section may be equally applicable to all sections.

What is claimed is:

1. A method for identifying a candidate compound, comprising:
   (a) obtaining a test compound having the ability to bind to cereblon (CRBN);
   (b) contacting the test compound with cells expressing CRBN, the contacting being in the presence of argininosuccinate synthetase 1 (ASS1);
   (c) assaying for direct or indirect recruitment of ASS1 and/or ubiquitination of ASS1 and/or degradation of ASS1 after step (b); and
   (d) classifying the test compound as a candidate compound if reduced, low or substantially no direct or indirect recruitment of ASS1 and/or ubiquitination of ASS1 and/or degradation of ASS1 is detected.

2. A method for making a therapeutic composition, comprising:
   (a) identifying a candidate compound by:
      (i) obtaining a test compound having the ability to bind to cereblon (CRBN);
      (ii) contacting the test compound with cells expressing CRBN, the contacting being in the presence of argininosuccinate synthetase 1 (ASS1);
      (iii) assaying for direct or indirect recruitment of ASS1 and/or ubiquitination of ASS1 and/or degradation of ASS1 after step (ii); and
      (iv) classifying the test compound as a candidate compound if reduced, low or substantially no direct or indirect recruitment of ASS1 and/or ubiquitination of ASS1 and/or degradation of ASS1 is detected; and
   (b) formulating the candidate compound for use in a therapy.

3. The method of claim 1, wherein the recruitment of ASS1 is direct binding of ASS1 to CRBN.

4. The method of claim 1, further comprising assaying for direct or indirect recruitment and/or ubiquitination and/or degradation of a substrate and/or neosubstrate of CRBN that is not ASS1.

5. The method of claim 4, wherein the substrate and/or neosubstrate of CRBN that is not ASS1 is selected from Ikaros (IKZF1), Helios (IKZF2), Aiolos (IKZF3), Eos (IKZF4), Pegasus (IKZF5), CSNK1A, CK1a, and ZFP91.

6. The method of claim 4, wherein the reduced, low or substantially no direct or indirect recruitment of ASS1 and/or ubiquitination of ASS1 and/or degradation of ASS1 is relative to the amount of direct or indirect recruitment and/or ubiquitination and/or degradation of the substrate and/or neosubstrate of CRBN that is not ASS1.

7. The method of any one of claim 1, wherein the reduced, low or substantially no direct or indirect recruitment of ASS1 and/or ubiquitination of ASS1 and/or degradation of ASS1 is relative to an amount of direct or indirect recruitment of ASS1 and/or ubiquitination of ASS1 and/or degradation of ASS1 in a reference sample lacking the test compound and/or a basal level.

8. The method of claim 1, wherein the candidate compound demonstrates reduced side effects in a subject receiving the candidate compound relative to one of thalidomide, lenalidomide, and pomalidomide.

9. The method of claim 8, wherein the side effects include reduced or impaired liver function and/or include reduced or impaired kidney function and/or reduced or impaired T cell functions.

10. The method of claim 1, wherein the test compound or candidate compound binds CRBN but weakly binds to, or does not substantially bind, ASS1.

11. The method of claim 4, wherein the test compound or candidate compound binds CRBN but weakly binds to, or does not substantially bind, the substrate and/or neosubstrate of CRBN that is not ASS1.

12. The method of claim 1, wherein the test compound or candidate compound binds CRBN with an affinity of about 1 µM, or higher.

13. The method of claim 12, wherein the test compound or candidate compound binds CRBN with an affinity of about 500 nM, or about 300 nM, about 100 nM, about 30 nM, about 10 nM, or about 1 nM.

14. The method of claim 1, wherein the test compound or candidate compound is a molecular glue.

15. The method of claim 1, wherein the test compound or candidate compound is an immunomodulatory drug or an immunomodulatory imide drug (IMiD), or a pharmaceutically acceptable salt, solvate, hydrate, co-crystal, clathrate, or polymorph thereof.

16. The method of claim 1, wherein the test compound or candidate compound binds CRBN and not ASS1.

17. The method of claim 4, wherein the test compound or candidate compound binds CRBN and the substrate and/or neosubstrate of CRBN that is not ASS1.

18. A method for identifying a candidate compound, comprising:
   (a) obtaining a test compound having the ability to bind to cereblon (CRBN);
   (b) contacting the test compound with cells expressing CRBN, the contacting being in the presence of argininosuccinate synthetase 1 (ASS1);
   (c) assaying for direct or indirect recruitment of ASS1 and/or ubiquitination of ASS1 and/or degradation of ASS1 after step (b); and
   (d) classifying the test compound as a candidate compound if reduced, low or substantially no direct or indirect recruitment of ASS1 and/or ubiquitination of ASS1 and/or degradation of ASS1 is detected,
   further comprising assaying for direct or indirect recruitment and/or ubiquitination and/or degradation of a substrate and/or neosubstrate of CRBN that is not ASS1, the substrate and/or neosubstrate of CRBN that is not ASS1 is selected from Ikaros (IKZF1), Helios (IKZF2), Aiolos (IKZF3), Eos (IKZF4), Pegasus (IKZF5), CSNK1A, CK1a, and ZFP91, and
   wherein the classifying is based on the test compound's ability to shift a ratio of direct or indirect recruitment of ASS1 and/or ubiquitination of ASS1 and/or degradation of ASS1 relative to direct or indirect recruitment and/or, ubiquitination and/or degradation of the substrate and/or neosubstrate of CRBN that is not ASS1.

19. The method of claim 18, wherein the test compound or candidate compound binds CRBN but weakly binds to, or does not substantially bind, ASS1.

20. The method of claim 18, wherein the test compound or candidate compound binds CRBN with an affinity of about 1 µM, or higher.

* * * * *